(12) United States Patent
Hakiri et al.

(10) Patent No.: US 8,815,002 B2
(45) Date of Patent: Aug. 26, 2014

(54) INKJET RECORDING INK

(71) Applicants: Minoru Hakiri, Shizuoka (JP); Mitsuru Naruse, Shizuoka (JP); Masayasu Nonogaki, Shizuoka (JP); Naoya Morohoshi, Shizuoka (JP)

(72) Inventors: Minoru Hakiri, Shizuoka (JP); Mitsuru Naruse, Shizuoka (JP); Masayasu Nonogaki, Shizuoka (JP); Naoya Morohoshi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/706,633

(22) Filed: Dec. 6, 2012

(65) Prior Publication Data
US 2013/0147876 A1 Jun. 13, 2013

(30) Foreign Application Priority Data

Dec. 8, 2011 (JP) ................................. 2011-268789
Feb. 1, 2012 (JP) ................................. 2012-020341

(51) Int. Cl.
*C09D 11/02* (2014.01)
(52) U.S. Cl.
USPC .................... 106/31.65; 106/31.36; 106/31.6
(58) Field of Classification Search
USPC ............................................. 106/31.6, 31.86
See application file for complete search history.

(56) References Cited

U.S. PATENT DOCUMENTS

| 6,471,763 | B1 | 10/2002 | Karl |
| 6,503,311 | B1 * | 1/2003 | Karl et al. ..................... 106/31.9 |
| 7,101,919 | B2 | 9/2006 | Hasegawa et al. |
| 7,798,629 | B2 | 9/2010 | Hakiri et al. |
| 8,197,049 | B2 | 6/2012 | Hakiri et al. |
| 8,247,473 | B2 | 8/2012 | Naruse et al. |
| 2003/0196571 | A1 | 10/2003 | Hakiri et al. |
| 2006/0209149 | A1 | 9/2006 | Hasegawa et al. |
| 2006/0272543 | A1 | 12/2006 | Hakiri et al. |
| 2008/0036830 | A1 | 2/2008 | Natori et al. |
| 2010/0147187 | A1 * | 6/2010 | Tauber et al. ................ 106/31.9 |
| 2010/0196602 | A1 | 8/2010 | Koyano et al. |
| 2010/0277548 | A1 | 11/2010 | Hakiri et al. |
| 2010/0302306 | A1 | 12/2010 | Hasegawa et al. |
| 2010/0309260 | A1 | 12/2010 | Hakiri et al. |

(Continued)

FOREIGN PATENT DOCUMENTS

| CN | 101775248 | 7/2010 |
| JP | 10-324818 | 12/1998 |

(Continued)

OTHER PUBLICATIONS

Chinese Office Action issued Mar. 5, 2014, in corresponding Chinese Patent Application No. 201210524078.4 (with English-language Translation).

*Primary Examiner* — Veronica F Faison
(74) *Attorney, Agent, or Firm* — Oblon, Spivak, McClelland, Maier & Neustadt, L.L.P.

(57) ABSTRACT

An inkjet recording ink including: water; a first pigment dispersion; a second pigment dispersion; and a penetrating agent, wherein the first pigment dispersion includes oxidized carbon black CB-1 dispersed therein with a pH of the first pigment dispersion adjusted to 6 to 8 with an alkali metal hydroxide, where the oxidized carbon black CB-1 is oxidized with ozone and has a volatile content of 10% to 20% and a BET specific surface area of 90 $m^2/g$ to 150 $m^2/g$, and the second pigment dispersion includes carbon black CB-2 dispersed therein with a naphthalene sulfonic acid-formalin condensate, where the carbon black CB-2 has an average particle diameter (D50) of 50 nm to 180 nm as measured by a dynamic light scattering method and a standard deviation of particle diameters of the carbon black CB-2 is equal to or lower than ½ of the average particle diameter.

5 Claims, 2 Drawing Sheets

(56) References Cited

U.S. PATENT DOCUMENTS

| | | |
|---|---|---|
| 2011/0074865 A1 | 3/2011 | Hasegawa et al. |
| 2011/0267398 A1 | 11/2011 | Hakiri et al. |
| 2012/0026237 A1 | 2/2012 | Hakiri et al. |
| 2012/0062646 A1 | 3/2012 | Hasegawa et al. |
| 2012/0092411 A1 | 4/2012 | Hakiri et al. |
| 2012/0154492 A1 | 6/2012 | Hakiri et al. |
| 2012/0242741 A1 | 9/2012 | Hasegawa et al. |
| 2012/0262518 A1 | 10/2012 | Naruse et al. |
| 2012/0306964 A1* | 12/2012 | Nakajima ............... 347/22 |

FOREIGN PATENT DOCUMENTS

| | | |
|---|---|---|
| JP | 11-349849 | 12/1999 |
| JP | 2000-290554 | 10/2000 |
| JP | 2000-319572 | 11/2000 |
| JP | 2001-164148 | 6/2001 |
| JP | 2004-224955 | 8/2004 |
| JP | 3907263 | 1/2007 |
| JP | 2008-260926 | 10/2008 |
| JP | 2009-067907 | 4/2009 |
| JP | 2009-149815 | 7/2009 |
| JP | 4389348 | 10/2009 |
| JP | 2010-168433 | 8/2010 |
| JP | 2010-180332 | 8/2010 |
| JP | 2011-068838 | 4/2011 |
| JP | 2012-036255 | 2/2012 |
| WO | WO 2011/030880 | 3/2011 |
| WO | WO 2012/018098 A1 | 2/2012 |

* cited by examiner

INKJET RECORDING INK

BACKGROUND OF THE INVENTION

1. Field of the Invention

The present invention relates to an inkjet recording ink, an ink cartridge, an inkjet recording method, an inkjet recording apparatus and an ink recorded matter.

2. Description of the Related Art

In recent years, an inkjet recording method has become more widely used since it is an image forming method which is performed through a simpler process than in other recording methods, which easily forms full-color images and which can form high-definite images even with a simple apparatus The inkjet recording method is applied to an image forming apparatus where a small amount of ink is made to jet through pressure given by bubbles generated with heat or by a piezoelectric element or electrostatic force whereby the ink is attached onto recording media such as paper and then quickly dried (or penetrated into the recording media) to obtain images. The inkjet recording method has been finding its applications in printers or printing applications for industrial use as well as personal use.

In particular, demand for industrial use has recently been increased, which has been requiring responsiveness to high-speed printing or various recording media. There has also been a need of an inkjet printer equipped with a line head for responding to increase in printing speed.

Furthermore, increased demand has recently arisen for aqueous ink from the environmental or safety aspect. However, such aqueous ink depends greatly on recording media and raises various problems in images. In particular, these problems are significant when unsmooth paper is used as recording media.

The aqueous ink requires time until it is dried. In addition, the aqueous ink is highly compatible to paper and penetrates it to a higher extent. Especially for non-coated, relatively unsmooth paper, the colorant penetrates paper to reach the inside thereof and as a result the formed image is decreased in density of the colorant. This is a problem that is not involved by a solvent ink.

In order to increase the drying speed of ink on recording media to respond to the printing speed that is recently increasing more and more, a penetrating agent is added to an ink for water serving as a solvent to permeate recording media, thereby achieving quick drying.

However, incorporation of a penetrating agent increases penetration property of not only water but also colorant, leading to a considerable decrease in image density unlike inks used in paints or ballpoint pens.

In view of this, in one proposed method for increasing the image density of prints, acidic carbon black is oxidized with hypochlorous acid to control the ratio of the amount of functional groups on the surface to the specific surface area of the carbon black (see Japanese Patent Application Laid-Open (JP-A) No. 2000-319572).

However, the treatment with hypochlorous acid in the above proposal is performed in a wet process, requiring dehydration and/or washing leading to cost elevation. In addition, salts and other substances remain even after washing, and the obtained ink has not shown satisfactory storage stability when used for an inkjet process. Furthermore, it has not been satisfactory in terms of image density also when unsmooth paper was used.

Similarly, defining the amount of functional groups on the surface, the specific surface area, and other properties of carbon black is proposed in order to improve dispersion stability (see JP-A No. 2004-224955). This proposal, however, includes performing wet oxidation with peroxodisulfates and thus for the same reasons has not been satisfactory in storage stability or image density.

Also, there has been proposed use of furnace carbon black having the defined DBP oil absorption amount and acid groups (see JP-A No. 10-324818).

However, in order for furnace carbon black to have the above defined DBP oil absorption amount, the specific surface area of furnace carbon black used has to be large. In this case, even when the number of acid groups is increased by oxidation, the number of effective acid groups actually present on the carbon black surface is small. It has not been satisfactory in storage stability or image density when used for ink.

Also, there has been proposed an ink using oxidized carbon black whose volatile content is adjusted to 25% or higher (see JP-A No. 2001-164148). In this proposal, such a high volatile content makes carbon black more wet to water, resulting in improved water dispersibility. However, an increased amount of impurities during oxidation degrades the stability of the obtained ink. In addition, the carbon black becomes too high in compatibility to water, and the pigment tends to penetrate paper together with water, making it impossible to attain satisfactory image density.

Also, there has been proposed used of carbon black having the defined volatile content and the CTAB surface area/iodine value (see JP-A No. 11-349849). This proposal, however, is difficult to attain both satisfactory image density and satisfactory storage stability.

Also, there has been proposed an inkjet recording ink using a naphthalene sulfonic acid-formalin condensate as a dispersing agent for carbon black (see JP-A Nos. 2009-067907 and 2009-149815). These proposals, however, improve water dispersibility but make the ink too highly compatible to water. As a result, the pigment tends to penetrate paper more together with water, not achieving satisfactory image density.

Also, there has been an aqueous ink set containing two inks of different colors, one of which contains a water-dispersible colorant containing a surfactant dispersing agent (see JP-A No. 2008-260926). This proposal improves bleeding at the boundary between the two colors, but is not satisfactory with respect to image density.

Also, there has been proposed a recording liquid containing: carbon black having a DBP oil absorption amount of 140 mL/100 g or more and a pH of 6 or higher; and a water-soluble polymer compound containing a carboxylic acid and having an acid value of 250 mgKOH/g or more as a free acid (see JP-A No. 2000-290554). In addition, there has been proposed a recording liquid containing, as carbon black, a modified carbon black the surface of which has been coated with a metal oxide at least partially (see Japanese Patent (JP-B) No. 4389348). Furthermore, there has been proposed a recording liquid containing carbon black having a DBP oil absorption amount of 140 mL/100 g or more, a volatile content of 4% lower, a pH of 7 to 14, and a BET specific surface area of 100 $m^2/g$ or more (see JP-B No. 3907263). These proposals, however, cannot be said that they are satisfactory in terms of image density.

Meanwhile, the diameter of nozzles tends to be smaller in order to achieve high quality images and high speed processes. However, inkjet recording inks containing a pigment easily involves aggregation of its solid content as a result of evaporation of water, and thus ensuring their ejection stability is desired.

For example, there has been proposed an aqueous ink composition containing a pigment, water, an organic solvent, a resin and a surface tension adjuster for ink compositions (see JP-A No. 2011-68838). In this proposal, the organic solvent is a compound represented by General Formula: $R^1OCH_2CH_2CONR^2R^3$ (where $R^1$ is a C1 to C8 alkyl group, $R^2$ and $R^3$ are each independently a hydrogen atom, a C1 to C6 alkyl group, or a C1 to C6 alkyl group containing an ether bond) and the amount of the organic solvent is 10% by mass to 49% by mass relative to the total amount of water and the organic solvent.

However, the above proposal cannot simultaneously achieve satisfactory levels of image density on plain paper, storage stability, ejection stability, adhesion resistance and drying property.

SUMMARY OF THE INVENTION

The present invention has been made in view of the above prior arts and aims to provide: an inkjet recording ink excellent in ejection stability and storage stability and capable of realizing high image density on both smooth paper and unsmooth paper; and an ink cartridge, an inkjet recording method, an inkjet recording apparatus and an ink recorded matter.

In view of the above prior arts, the present invention aims to provide: an inkjet recording ink excellent in image density on plain paper, storage stability, ejection stability, adhesion resistance and drying property; an ink cartridge housing the inkjet recording ink; and an inkjet recording apparatus using the inkjet recording ink.

Means for solving the above problems are as follows.

In a first embodiment, an inkjet recording ink of the present invention contains at least: water; a first pigment dispersion; a second pigment dispersion; and a penetrating agent, wherein the first pigment dispersion includes oxidized carbon black CB-1 which is dispersed therein with a pH of the first pigment dispersion adjusted to 6 to 8 with an alkali metal hydroxide, where the oxidized carbon black CB-1 is oxidized with ozone and has a volatile content of 10% to 20% and a BET specific surface area of 90 m$^2$/g to 150 m$^2$/g, and wherein the second pigment dispersion includes carbon black CB-2 which is dispersed therein with a naphthalene sulfonic acid-formalin condensate, where the carbon black CB-2 has an average particle diameter (D50) of 50 nm to 180 nm as measured by a dynamic light scattering method and a standard deviation of particle diameters of the carbon black CB-2 is equal to or lower than ½ of the average particle diameter (D50).

In a second embodiment, an inkjet recording ink of the present invention contains: oxidized carbon black oxidized with ozone; a compound expressed by $CH_3OCH_2CH_2CON(CH_3)_2$; and water, wherein the oxidized carbon black has a volatile content of 10% to 20% and a BET specific surface area of 90 m$^2$/g to 150 m$^2$/g.

According to the present invention, it is possible to provide an inkjet recording ink excellent in storage stability, capable of realizing high image density on both unsmooth paper and smooth paper, and excellent in ejection stability from nozzles; and an ink cartridge, an inkjet recording apparatus, inkjet recording method and an ink recorded matter using the inkjet recording ink.

According to the present invention, it is possible to provide an inkjet recording ink excellent in image density on plain paper, storage stability, ejection stability, adhesion resistance and drying property; an ink cartridge using the inkjet recording ink; and an ink cartridge, an inkjet recording apparatus, inkjet recording method and an ink recorded matter using the inkjet recording ink.

Figure 1:
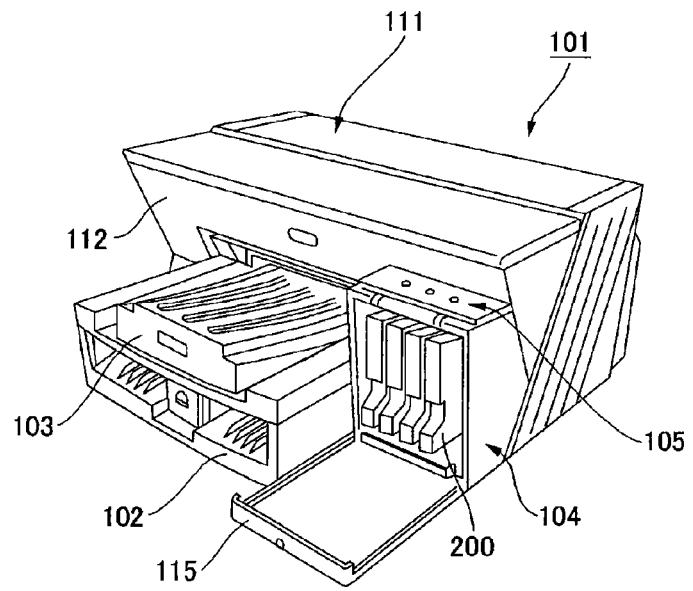
FIG. 1 is a schematic view of one example of an inkjet recording apparatus used in the present invention.

DETAILED DESCRIPTION OF THE INVENTION (Inkjet Recording Ink According to a First Embodiment)

An inkjet recording ink according to a first embodiment of the present invention contains at least water, a first pigment dispersion, a second pigment dispersion and a penetrating agent; and, if necessary, further contains other ingredients.

It is not clear why the inkjet recording ink of the present invention can achieve both desired image density and desired storage stability, but the following is one possible reason.

As a result of the extensive studies conducted by the present inventors on the volatile content of carbon black (hereinafter may be referred to as "CB"), they obtained the following findings. Specifically, when the volatile content of CB is high, carbon black tends to remain on a paper surface to increase the image density although the reason for this is unclear. This increase in image density occurs when the volatile content thereof exceeds about 20%, but reaches saturation point before long to make it impossible to obtain sufficient image density. As the volatile content of CB becomes high, the hydrophilicity of carbon black also becomes high, so that its dispersibility increases. As a result, the amount of impurities generated through oxidation increases and the obtained ink becomes poor in stability over time, making it impossible for the ink to achieve both desired image density and desired storage stability.

The present inventors also studied the ratio between the specific surface area and the volatile content of CB. However, it is not necessarily possible to achieve both desired image density and desired storage stability.

As a result of further studies by the present inventors, insufficient image density can be improved by performing the oxidation through ozone oxidation involving less impurity, adjusting the volatile content of CB to fall within the range of 10% to 20% where the effect of increasing the image density does not appear, and adjusting the BET specific surface area of CB to fall within the range of 90 m$^2$/g to 150 m$^2$/g, to thereby control the image density and the storage stability; and further by adjusting the pH during dispersing to fall within the range of 6 to 8.

<First Pigment Dispersion>

Carbon black used in the first pigment dispersion is carbon black CB-1 having a volatile content of 10% to 20% and a BET specific surface area of 90 m$^2$/g to 150 m$^2$/g. The carbon black CB-1 is obtained by ozone-treating carbon black having a BET specific surface area of 90 m$^2$/g to 150 m$^2$/g to have a volatile content of 10% to 20%.

The method for the ozone oxidation is not particularly limited and may be a known method. A dry treatment where carbon black is exposed to flowing ozone gas is preferred since it has high oxidation ability.

A treatment using water cannot sufficiently perform oxidation because of reaction occurring between water and ozone in some cases.

The volatile content of CB can be controlled by adjusting the amount of ozone and the treating time. The amount (concentration) of ozone is increased or the treating time is extended, to thereby obtain CB having a high volatile content.

Before reaching saturation point, the treating time and the volatile content of CB are in a substantially linear relationship. However, at saturation point after a certain period of time has passed (after that point, the volatile content of CB does not increase), it is necessary to make adjustment while confirming the volatile content of CB. The above conditions vary with the properties of CB before oxidation treatment and the presence of impurities, but may be appropriately adjusted. Notably, ozone can be generated by passing air or oxygen through an ozone generator.

Carbon black used for oxidation is not particularly limited so long as it has a BET specific surface area of 90 $m^2/g$ to 150 $m^2/g$; however, it preferably has an oil absorption amount of 230 mL/100 g or more (measured by the DIN ISO 787/5 method) in terms of image density.

The carbon black is not particularly limited and may be appropriately selected depending on the intended purpose. Examples of the carbon black employable include furnace black, lamp black, acetylene black and gas black, with gas black being preferred in terms of image density.

The primary particle diameter of the carbon black is not particularly limited and may be appropriately selected depending on the intended purpose, but is preferably 30 nm to 13 nm.

The volatile content of CB is a value measured by the measurement method described in DIN 53552. This value is a percentage of an amount of CB reduced when a measurement sample is heated at 950° C. for 7 min. The BET specific surface area is a value measured by the measurement method described in DIN 66132.

The first pigment dispersion is obtained by dispersing the pigment, water and optional various additives using a known disperser such as a sand mill, a ball mill, a roll mill, a bead mill, a nanomizer or a homogenizer. The pH of the first pigment dispersion is adjusted with an alkali metal hydroxide to fall within the range of 6 to 8.

The amount of the carbon black CB-1 (pigment) contained in the first pigment dispersion is not particularly limited and may be appropriately selected depending on the intended purpose, but is preferably 10% by mass to 40% by mass.

Preferably, the pH adjustment of the first pigment dispersion is performed before dispersion. The pH adjustment after dispersion tends to be disadvantageous in terms of dispersibility and storage stability.

Examples of the alkali metal hydroxide include sodium hydroxide, potassium hydroxide and lithium hydroxide.

<Second Pigment Dispersion>

Carbon black contained in the second pigment dispersion is carbon black CB-2 having an average particle diameter (D50) of 50 nm to 180 nm as measured by the dynamic light scattering method, where a standard deviation of particle diameters is equal to or lower than ½ of the average particle diameter (D50). The dispersing agent for the carbon black CB-2 is a naphthalenesulfonic acid-formalin condensate.

The amount of the carbon black CB-2 (pigment) contained in the second pigment dispersion is not particularly limited and may be appropriately selected depending on the intended purpose, but is preferably 10% by mass to 40% by mass.

The dispersing agent for the carbon black CB-2 is preferably contained at a rate of 0.1 to 2 relative to 1 of the carbon black on the mass basis, more preferably at a rate of 0.25 to 1 relative to 1 of the carbon black on the mass basis.

When the rate of the dispersing agent relative to the carbon black CB-2 is less than 0.1, the above-described effects are difficult to attain. In addition, the pigment dispersion and the ink are poor in storage stability and as a result nozzle clogging tends to occur. When it is more than 2, the viscosities of the pigment dispersion liquid and the ink are excessively high and it tends to be difficult to perform printing by the inkjet method.

When the rate of the dispersing agent used is adjusted to fall within the above range, it is possible to form carbon black CB-2 having an average particle diameter (D50), in the second pigment dispersion, of 50 nm to 180 nm as measured by the dynamic light scattering method, where a standard deviation of particle diameters is equal to or lower than ½ of the average particle diameter (D50); hence it is possible to obtain a pigment dispersion excellent in image density, ejection stability and liquid stability.

When the average particle diameter (D50) of the carbon black CB-2 is less than 50 nm, the pigment dispersion and the ink are degraded in storage stability and as a result nozzle clogging tends to occur. When the average particle diameter (D50) thereof is more than 180 nm, nozzle clogging tends to occur. Needless to say, both cases are not preferred.

When the standard deviation of particle diameters exceeds ½ of the average particle diameter, the pigment dispersion and the ink are degraded in storage stability and as a result nozzle clogging tends to occur.

The total amount of dimer, trimer and tetramer of naphthalenesulfonic acid in the naphthalenesulfonic acid-formalin condensate (i.e., the dispersing agent) is not particularly limited and may be appropriately selected depending on the intended purpose, but is preferably 20% by mass to 80% by mass. When the total amount thereof is less than 20% by mass, dispersibility becomes poor and the pigment dispersion and the ink are degraded in storage stability, so that nozzle clogging tends to occur. When it is more than 80% by mass, the viscosity the pigment dispersion becomes high to make it difficult to disperse the pigment dispersion.

The carbon black CB-2 may be a commercially available product. Examples of the commercially available product include: #10B, #20B, #30, #33, #40, #44, #45, #45L, #50, #55, #95, #260, #900, #1000, #2200B, #2300, #2350, #2400B, #2650, #2700, #4000B, CF9, MA8, MA11, MA77, MA100, MA220, MA230, MA600 and MCF88 (these products are of Mitsubishi Chemical Corporation); MONARCH 120, MONARCH 700, MONARCH 800, MONARCH 880, MONARCH 1000, MONARCH 1100, MONARCH 1300, MONARCH 1400, REGAL L, REGAL 99R, REGAL 250R, REGAL 300R, REGAL 330R, REGAL 400R, REGAL 500R and REGAL 660R (these products are of Cabot Corporation); PRINTEX A, PRINTEX G, PRINTEX U, PRINTEX V, PRINTEX 55, PRINTEX 140U, PRINTEX 140V, NIPEX60, NIPEX150, NIPEX170, NIPEX180, SPECIAL BLACK 4, SPECIAL BLACK 4A, SPECIAL BLACK 5, SPECIAL BLACK 6, SPECIAL BLACK 100, SPECIAL BLACK 250, COLOR BLACK FW1, COLOR BLACK FW2, COLOR BLACK FW2V, COLOR BLACK FW18, COLOR BLACK FW200, COLOR BLACK S150, COLOR BLACK S160 and COLOR BLACK S170 (these products are of Degussa Co., Ltd.). These may be used alone or in combination.

In addition to the black inks, color or colorless inks may be used.

Examples of magenta pigments include Pigment Red 5, 7, 12, 48(Ca), 48(Mn), 57(Ca), 57:1, 112, 122, 123, 168, 184 and 202, and Pigment Violet 19.

Examples of cyan pigments include Pigment Blue 1, 2, 3, 15, 15:3, 15:4, 16, 22 and 60, and Vat Blue 4 and 60.

Examples of yellow pigments include Pigment Yellow 1, 2, 3, 12, 13, 14, 16, 17, 73, 74, 75, 83, 93, 95, 97, 98, 114, 120, 128, 129, 138, 150, 151, 154, 155 and 180.

When Pigment Yellow 74 is used as a yellow pigment, Pigment Red 122 and Pigment Violet 19 are used as magenta pigments, and Pigment Blue 15 is used as a cyan pigment, it is possible to obtain an ink that is excellent in color toner and light fastness and strikes a balance between its properties.

The amount of the pigment contained in the pigment dispersion or the ink is not particularly limited and may be appropriately selected depending on the intended purpose, but is preferably 0.1% by mass to 50% by mass, more preferably 0.1% by mass to 30% by mass.

The second pigment dispersion is obtained by dispersing the pigment, dispersing agent, water and optional various additives using a known disperser such as a sand mill, a ball mill, a roll mill, a bead mill, a nanomizer or a homogenizer.

In the present invention, it is effective to use a bead mill providing good dispersing efficiency and the particle diameter is easy to control using it. It is important to appropriately select the material and diameter of beads in controlling the particle diameter. Examples of the material of the beads include ceramics, glass, stainless steel and zirconia. Among them, from the viewpoints of avoiding contamination and high dispersing efficiency, effectively used are zirconia beads which have a high true specific gravity and do not cause contamination much.

The diameter of the beads is not particularly limited and varies depending on the target particle diameter in the pigment dispersion. For the second pigment dispersion, the diameter of the beads is preferably 0.3 mm to 0.03 mm, and from the viewpoints of dispersion efficiency and stability of the pigment, it is particularly preferably 0.03 mm.

The particle diameter is controlled with adjustment of the rotor's circumferential speed of the disperser and the dispersion time. A high speed circumferential speed of the rotor is advantageous in terms of dispersion efficiency. In this case, however, many dispersoids having small particle diameters are formed and then secondarily aggregate together to degrade the dispersion stability. Thus, it is important to appropriately set the circumferential speed. In the present invention, the optimal circumferential speed of the disperser is calculated and also the dispersion time is adjusted, to thereby obtain the second pigment dispersion.

The measurement conditions for the particle diameter by the dynamic light scattering method are as follows.

[Measurement Conditions for the Particle Diameter in the Pigment Dispersion and Ink]

Measurement device: Particle size distribution analyzer UPA150 (product of NIKKISO CO., LTD.)

Measurement conditions

1) Solid content concentration of measurement liquid: 0.1% by mass (solvent: water)
2) Transparent Particles: Yes
3) Spherical Particles: No
4) Part. Refractive Index: 1.86
5) Part. Density: 1.86 (gm/cm$^3$)
6) Fluid: Default Fluid
7) Fluid Refractive Index: 1.33
8) Viscosity High 30° C.: 0.797 cp
9) Viscosity Low 20° C.: 1.002 cp
10) Display: Volume distribution The measurement is performed under the above conditions to determine the average particle diameter (D50) and the standard deviation (sd).

The average particle diameter (D50) refers to a particle diameter (nm) at the point where a cumulative curve is 50%, the cumulative curve being obtained with the total volume of a population of powder (pigment) being 100%.

The standard deviation is calculated from the following equation. It is indicative of a distribution range of the measured particle size distribution and does not mean a standard deviation in statistics (statistical error).

Here, if there is a population of powder (pigment) and its particle size distribution is determined, $$\text{Standard deviation}(sd) = \frac{(d84\% - d16\%)}{2}$$

where d84%: a particle diameter (nm) at the point of a cumulative curve is 84% and d16%: a particle diameter (nm) at the point of a cumulative curve is 16%, the cumulative curve being obtained with the total volume of a population of powder (pigment) being 100%.

The total amount of the carbon black CB-1 of the first pigment dispersion and the carbon black CB-2 of the second pigment dispersion contained in the inkjet recording ink according to the first embodiment is not particularly limited and may be appropriately selected depending on the intended purpose, but is preferably 1% by mass to 20% by mass.

The mass ratio between the carbon black CB-1 and the carbon black CB-2 (CB-1:CB-2) is not particularly limited and may be appropriately selected depending on the intended purpose, but is preferably 1:48 to 1:1, more preferably 1:20 to 1:5.

When the amount of the carbon black CB-1 is high, the image density tends to be higher. However, the production cost is elevated since the carbon oxidation treating step and the impurity removing step are necessary, which is not preferred.

The inkjet recording ink of the present invention containing both the first and second pigment dispersions has an advantageous feature that it is higher in image density on plain paper (unsmooth paper) and is also much higher in image density on glossy paper (smooth paper) than in an inkjet recording ink containing either the first pigment dispersion or the second pigment dispersion.

Regarding whether a recording medium is smooth paper or unsmooth paper, the recording medium is measured for smoothness and classified based on the smoothness into smooth paper or unsmooth paper.

In general, the unsmooth paper has a smoothness of 500 sec or less and is paper that has not been subjected to surface coating treatment. Meanwhile, many of the smooth paper have been subjected to surface coating treatment, and the smooth paper has a smoothness of 500 sec or more, including art paper and cast coat paper.

The above smoothness is measured with an Oken type smoothness tester in the following manner. Specifically, a hollow head is placed on a paper surface and the interior of the head is reduced in pressure, to thereby measure, as the smoothness, the time (sec) required that a certain amount of air flows into the interior from the gap between the head and the paper surface.

At least one of the first and second pigment dispersions is made to contain a polyether-type polyurethane resin having an acid value of 40 mgKOH/g to 100 mgKOH/g, thereby achieving improvement in storage stability while maintaining the image density.

The above polyurethane resin is preferably added thereto as a polyurethane resin emulsion.

As the above polyurethane resin emulsion, there are an emulsion prepared by emulsifying a relatively hydrophilic common polyurethane resin with an emulsifier surrounding it, and a self-emulsifying emulsion whose resin itself has a functional group introduced by means of copolymerization which plays a role as an emulsifier.

An anionic self-emulsifying polyurethane resin emulsion, which is always excellent in dispersion stability, is used for obtaining the ink of the present invention. The polyurethane resin is preferably of a polyether type rather than of a polyester type or a polycarbonate type from the viewpoints of adhesiveness and dispersion stability. Although the reason is clear, many of the polyurethane resins other than the polyether-type polyurethane resins are low in solvent resistance, easily causing aggregation in ink during storage at high temperatures.

The amount of the polyether-type polyurethane resin contained in the inkjet recording ink according to the first embodiment is not particularly limited and may be appropriately selected depending on the intended purpose, but is preferably 0.1% by mass to 10% by mass, more preferably 0.5% by mass to 5% by mass.

The acid value of the polyether-type polyurethane resin is not particularly limited and may be appropriately selected depending on the intended purpose, but is preferably 20 mgKOH/g to 100 mgKOH/g, more preferably 40 mgKOH/g to 80 mgKOH/g. The reason why the acid value falling within this range is preferred is because the polyether-type polyurethane resin having the acid value falling within the above range exhibits excellent dispersibility and the obtained inkjet recording ink is excellent in image density and ejection stability.

The acid value of the polyether-type polyurethane resin can be measured with, for example, the methods described in JIS K0070:1992, page 62 of "Polyester Resin" (published by Nikkan Kogyo Shimbun CO., LTD., the first edition was published on Feb. 1, 1982 (the 10th reprint), and page 890 of "Kagaku Daijiten 3 abridged version" (Encyclopedic Dictionary of Chemistry 3 abridged version) (published by KYORITSU SHUPPAN CO., LTD., Aug. 15, 1989, abridged version the 32nd reprint).

The weight average molecular weight of the polyether-type polyurethane resin is not particularly limited and may be appropriately selected depending on the intended purpose, but is preferably 500 to 50,000.

The average particle diameter of primary particles in the polyether-type polyurethane resin emulsion is not particularly limited and may be appropriately selected depending on the intended purpose, but is preferably 20 nm or less, more preferably 15 nm or less, still more preferably 10 nm or less.

In the present invention, carbon black of a gas black type is suitably used in combination with the polyether-type polyurethane resin emulsion whose average particle diameter is smaller, so that its dispersion is stabilized. In particular, use of the polyether-type polyurethane resin emulsion having an average particle diameter of 10 nm or less more effectively prevents a failure that the ink is not discharged during printing although the inkjet printer operates.

When the ink has not been discharged, an ink path flow containing a nozzle hole of the inkjet printer has to be cleaned to restart printing, which however impairs its practical use.

The average particle diameter of the polyether-type polyurethane resin emulsion is a value measured under an environment of 23° C. and 55% RH using MICROTRAC UPA (product of NIKKISO CO., LTD.).

The glass transition temperature of the polyether-type polyurethane resin is not particularly limited and may be appropriately selected depending on the intended purpose, but is preferably −50° C. to 150° C., more preferably −10° C. to 100° C. The polyether-type polyurethane resin having a glass transition temperature higher than 150° C. forms a hard, glass film. However, when the polyether-type polyurethane resin is jetted onto an image support together with pigment particles, the resultant printed portion is lower in scratch resistance than expected. Meanwhile, the polyether-type polyurethane resin having a glass transition temperature of 150° C. or lower forms a soft, polyurethane film but provides excellent scratch resistance. The polyether-type polyurethane resin having a glass transition temperature of −50° C. or lower forms a too soft film which is poor in scratch resistance. As described above, when the same amount is added, the polyether-type polyurethane resin having a glass transition temperature of −50° C. to 150° C. provides better scratch resistance.

Notably, the glass transition temperature of the resin is, for example, a value measured DSC (differential scanning calorimeter) or TMA (thermomechanical analysis).

The polyether-type polyurethane resin emulsion is not particularly limited and may be appropriately selected depending on the intended purpose, but preferably has a minimum film forming temperature which is equal to or lower than room temperature. The minimum film forming temperature is more preferably 25° C. When the polyether-type polyurethane resin emulsion is formed into a film at room temperature or lower, especially 25° C. or lower, binding of paper fibers of an image support having undergone image formation automatically proceeds without heating or drying the image support, which is preferred.

Here, the above "minimum film forming temperature (MFT)" refers to the minimum temperature at which a transparent continuous film is formed as follows. Specifically, a metal plate (e.g., an aluminum plate) is thinly coated with aqueous emulsion particles obtained by dispersing in water polyether-type polyurethane resin emulsion particles, followed by heating. The aqueous emulsion particles become white powder at a temperature range equal to or lower than the minimum film forming temperature.

The "film formability" means that when fine resin particles are dispersed in water to form a resin emulsion, the resin emulsion is formed into a film by evaporating water which is a continuous layer thereof. This resin film has a role of firmly attaching the pigment in the ink onto the surface of an image support. By this, it is likely possible to realize an image excellent in scratch resistance and water proofness.

In the present invention, the polyether-type polyurethane resin emulsion particles does not have to be added to the pigment dispersion in advance, or may be added after preparation of an ink The inkjet recording ink of the present invention may contain a dispersing agent except condensates of naphthalene sulfonic acid-formalin in such an amount that the above effects are not impaired.

Examples of the dispersing agent include various surfactants such as anionic surfactants, cationic surfactants, amphoteric surfactants nonionic surfactants and polymeric dispersing agents. These may be used in combination.

Examples of the anionic surfactants include alkylsulfocarboxylic acid salts, α-olefinesulfonic acid salts, polyoxyethylene alkyl ether acetic acid salts, N-acylamino acids or salts thereof, N-acylmethyltaurine salts, alkylsulfuric acid salts polyoxyalkyl ether sulfuric acid salts, alkylsulfuric acid salts polyoxyethylene alkyl ether phosphoric acid salts, rosin acid soaps, castor oil sulfuric acid ester salts, laurylalcohol sulfuric acid ester salts, alkylphenol-type phosphoric acid esters, naphthalenesulfonic acid salts-formalin condensates, alkyl-type phosphoric acid esters, alkylallysulfonic acid salts, diethylsulfosuccinic acid salts and diethylhexylsulfosuccinic acid dioctylsulfosuccinic acid salts.

Examples of the cationic surfactants include 2-vinylpyridine derivatives and poly-4-vinylpyridine derivatives.

Examples of the amphoteric surfactants include lauryl dimethylamino acetic acid betaine, 2-alkyl-N-carboxymethyl-N-hydroxyethylimidazolinium betaine, coconut oil fatty acid amide propyldimethylamino acetic acid betaine, polyoctyl polyaminoethyl glycine, and other imidazoline derivatives.

Example of the nonionic surfactants include: ethers such as polyoxyethylene nonyl phenyl ethers, polyoxyethylene octyl phenyl ethers, polyoxyethylene dodecyl phenyl ethers, polyoxyethylene lauryl ethers, polyoxyethylene oleyl ethers, polyoxyethylene alkyl ethers and polyoxyallyl alkyl ethers; esters such as polyoxyethylene oleic acid esters, polyoxyethylene oleic acid esters, polyoxyethylene distearic acid esters, sorbitan laurate, sorbitan monostearate, sorbitan monooleate, sorbitan sesquioleate, polyoxyethylene monooleates and polyoxyethylene stearates; and acetyl glycols such as 2,4,7,9-tetramethyl-5-decyne-4,7-diol, 3,6-dimethyl-4-octyne-3,6-diol and 3,5-dimethyl-1-hexyne-3-ol.

The dispersion medium of the pigment dispersion preferably contains water; however, various organic solvents may be used in combination, if necessary.

Examples of the organic solvent include: alcohols such as methanol, ethanol, 1-propanol and 2-propanol; polyhydric alcohols such as ethylene glycol, diethylene glycol, triethylene glycol, propylene glycol and glycerin; pyrrolidone derivatives such as N-methylpyrrolidone and 2-pyrrolidone; acetone; methyl ethyl ketone; and alcanolo amines.

<Penetrating Agent>

The penetrating agent is not particularly limited and may be appropriately selected depending on the intended purpose, but preferably contains at least one kind of a polyol compound having a solubility of 0.2% by mass to 5.0% by mass in water of 20° C.

Examples of the polyol compound include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dim-ethyl-2,5-hexanediol, 5-hexane-1,2-diol and 2-ethyl-1,3-hexanediol. These may be used alone or in combination. Among them, 2-ethyl-1,3-hexanediol and 2,2,4-trimethyl-1,3-pentanediol are particularly preferred.

Other penetrating agents that can be used in combination with those described above are not particularly limited and may be appropriately selected depending on the intended purpose so long as they can dissolve in the ink to thereby control the ink to have the desirable properties. Examples thereof include: alkyl or aryl ethers of polyhydric alcohols such as diethylene glycol monophenyl ether, ethylene glycol monophenyl ether, ethylene glycol monoallyl ether, diethylene glycol monobutyl ether, propylene glycol monobutyl ether and tetraethylene glycol chlorophenyl ether; and lower alcohols such as ethanol.

The amount of the penetrating agent contained in the inkjet recording ink according to the first embodiment is not particularly limited and may be appropriately selected depending on the intended purpose, but is preferably 0.1% by mass to 4.0% by mass. When it is less than 0.1% by mass, the quick drying properties of the ink cannot be obtained, and thus image bleeding may occur. Whereas when it is more than 4.0% by mass, the colorant may be degraded in dispersion stability, which tends to cause clogging of a nozzle of a recording device, or the penetrating ability of the ink to a recording medium is excessively high, which may lower the image density or cause strikethrough.

<Water>

The water may be, for example, ultrapure water or pure water such as ion-exchange water, ultrafiltrated water, reverse osmosis water and distilled water.

The amount of the water contained in the inkjet recording ink according to the first embodiment is not particularly limited and may be appropriately selected depending on the intended purpose.

<Other Ingredients>

The inkjet recording ink according to the first embodiment of the present invention may optionally contain various additives such as wetting agents, surfactants, pH adjusters, antiseptic/antifungal agents, chelating reagents, antirust agents, antioxidants, UV absorbers, oxygen absorbers and light stabilizers.

—Wetting Agent—

The wetting agent is not particularly limited and may be appropriately selected depending on the intended purpose. Examples thereof include polyhydric alcohols, polyhydric alcohol alkyl ethers, polyhydric alcohol aryl ethers, nitrogen-containing heterocyclic compounds, amides, amines, sulfur-containing compounds, propylene carbonate, ethylene carbonate and other wetting agents. These may be used alone or in combination.

Examples of the polyhydric alcohols include glycerin, diethylene glycol, 1,3-butanediol, 3-methyl-1,3-butanediol, triethylene glycol, propylene glycol, dipropylene glycol, trimethylol propane, trimethylol ethane, ethylene glycol, tripropylene glycol, tetraethylene glycol, hexylene glycol, polyethylene glycol, polypropylene glycol, 1,5-pentanediol, 1,6-hexanediol, 1,2,6-hexanetriol, 1,2,4-butanetriol, 1,2,3-butanetriol and petriol.

Examples of the polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether.

Examples of the polyhydric aryl ethers include ethylene glycol monophenyl ether and ethylene glycol monobenzyl ether.

Examples of the nitrogen-containing heterocyclic compounds include 2-pyrrolidone, N-methyl-2-pyrrolidone, N-hydroxyethyl-2-pyrrolidone, 1,3-dimethylimidazolidinone, ε-caprolactam and γ-butyrolactone.

Examples of the amides include formamide, N-methylformamide and N,N-dimethylformamide.

Examples of the amines include monoethanolamine, diethanolamine, triethanolamine, monoethylamine, diethylamine and triethylamine.

Examples of the sulfur-containing compounds include dimethyl sulfoxide, sulfolane and thiodiethanol.

As the other wetting solvents, saccharides are preferable. Examples of the saccharides include monosaccharides, disaccharides, oligosaccharides (including trisaccharides and tetrasaccharides) and polysaccharides. Specific examples thereof include glucose, mannose, fructose, ribose, xylose, arabinose, galactose, maltose, cellobiose, lactose, sucrose, trehalose and maltotriose. Here, the aforementioned polysaccharides mean saccharides in a broad sense, which may include materials existing widely in nature, such as α-cyclodextrin and cellulose. Derivatives of these saccharides include reducing sugars of saccharides (for example, sugar alcohols, which is represented by the general formula: $HOCH_2(CHOH)_nCH_2OH$, where n is an integer of 2 to 5), oxidized sugars (for example, aldonic acid and uronic acid), amino acids and thio acids. Among them, sugar alcohols are preferable. Specific examples thereof include maltitol and sorbitol.

Among the above wetting agents, glycerin, diethylene glycol, 1,3-butanediol, 3-methyl-1,3-butanediol, 2-pyrrolidone and N-methyl-2-pyrrolidone are particularly preferred from the viewpoints of storage stability and ejection stability.

The formulation ratio of the pigment and the wetting agent strongly affects ejection stability of ink from heads. When the amount of the wetting agent is smaller for the solid content of the pigment, moisture evaporation is encouraged around the ink meniscus of nozzles, which may cause ejection failures.

The amount of the wetting agent contained in the inkjet recording ink according to the first embodiment is not particularly limited and may be appropriately selected depending on the intended purpose, but is preferably 20% by mass to 35% by mass, more preferably 22.5% by mass to 32.5% by mass. When it falls within this range, better results are obtained of drying property of ink, a storage test and a reliability test. When the amount of the wetting agent is less than 20% by mass, the resultant ink becomes easier to dry on nozzle surfaces, which may cause ejection failures. Whereas when it is more than 35% by mass, the resultant ink is poor in drying property on paper surfaces, which may lead to degradation in the quality of letters on plain paper.

—Surfactant—

The surfactant used is a surfactant that does not impair dispersion stability and has low surface tension and high leveling property, depending on a type of the pigment and the wetting agent used in combination. It is, for example, a fluorosurfactant or a silicone surfactant, with a fluorosurfactant being preferred.

The fluorosurfactant is not particularly limited and may be appropriately selected depending on the intended purpose, but is preferably a fluorosurfactant having 2 to 16 carbon atoms each having a fluorine atom, more preferably a fluorosurfactant having 4 to 16 carbon atoms each having a fluorine atom. When the number of the carbon atoms having a fluorine atom is less than 2, such fluorosurfactants cannot give any effects derived from the fluorine atom. When the number thereof is more than 16, there may be problems in, for example, ink storageability.

Examples of the anionic fluorosurfactants includes perfluoroalkyl sulfonic acid compounds, perfluoroalkyl carboxylic acid compounds, perfluoroalkyl phosphoric acid ester compounds, perfluoroalkylethylene oxide adducts, and polyoxyalkylene ether polymer compounds having a perfluoroalkyl ether group at the side chain thereof. Among them, polyoxyalkylene ether polymer compounds having a perfluoroalkyl ether group at the side chain thereof are particularly preferred since they have low foaming property.

Examples of the perfluoroalkyl sulfonic acid compounds include perfluoroalkyl sulfonic acids and salts of perfluoroalkyl sulfonic acids.

Examples of the perfluoroalkyl carboxylic acid compounds include perfluoroalkyl carboxylic acids and salts of perfluoroalkyl carboxylic acids.

Examples of the perfluoroalkyl phosphoric acid ester compounds include perfluoroalkyl phosphoric acid esters and salts of perfluoroalkyl phosphoric acid esters.

Examples of the polyoxyalkylene ether polymer compounds having a perfluoroalkyl ether group at the side chain thereof include polyoxyalkylene ether polymers having a perfluoroalkyl ether group at the side chain thereof, sulfuric ester salts of polyoxyalkylene ether polymers having a perfluoroalkyl ether group at the side chain thereof, and salts of polyoxyalkylene ether polymers having a perfluoroalkyl ether group at the side chain thereof.

Examples of counter ions of the salts of these fluorosurfactants include Li, Na, K, $NH_4$, $NH_3CH_2CH_2OH$, $NH_2(CH_2CH_2OH)_2$ and $NH(CH_2CH_2OH)_3$.

The fluorosurfactants may be appropriately synthesized or commercially available products. Examples of the commercially available products include: FS-300 (product of DuPont Co., Ltd.); FT-110, FT-250, FT-251, FT-400S, FT-150, FT-400SW (these are products of NEOS COMPANY LIMITED); and PF-151N (product of Omnova Solutions, Inc).

The silicone surfactant is not particularly limited and may be appropriately selected depending on the intended purpose, but is preferably silicone surfactants that are not decomposed even at a high pH. Examples thereof include side chain-modified polydimethylsiloxanes, both terminals-modified polydimethylsiloxanes, one terminal-modified polydimethylsiloxanes, and side chain- and both terminals-modified polydimethylsiloxanes. Those containing, as a modified group, a polyoxyethylene group and/or a polyoxyethylene polyoxypropylene group are particularly preferable since they have excellent properties as aqueous surfactants.

The silicone surfactants may be appropriately synthesized or commercially available products. The commercially available products are readily available from, for example, BYK Japan K.K., Shin-Etsu Chemical Co., Ltd. and Dow Corning Toray Co., Ltd.

The amount of the surfactant contained in the inkjet recording ink according to the first embodiment is not particularly limited and may be appropriately selected depending on the intended purpose, but is preferably 0.01% by mass to 3.0% by mass, more preferably 0.5% by mass to 2% by mass. When it is less than 0.01% by mass, the effects commensurate with the addition of the surfactant cannot be obtained in some cases. Whereas it is more than 3.0% by mass, the penetrating ability of the ink to a recording medium is excessively high, which may lower the image density or cause strikethrough.

—pH Adjuster—

The pH adjuster is not particularly limited and may be appropriately selected depending on the intended purpose, as long as it can adjust the pH to the range of 7 to 11 without having an adverse effect on an ink to be prepared. Examples thereof include alcohol amines, hydroxides of alkali metals, ammonium hydroxides, phosphonium hydroxides, and carbonates of alkali metals. When the pH is less than 7 or greater than 11, the inkjet head and/or an ink supply unit are/is dissolved in large amounts, and thus troubles such as degradation or leakage of the ink and ejection failure may arise.

Examples of the alcohol amines include diethanolamine, triethanolamine and 2-amino-2-ethyl-1,3-propanediol.

Examples of the hydroxides of alkali metals include lithium hydroxide, sodium hydroxide and potassium hydroxide.

Examples of the ammonium hydroxides include ammonium hydroxide, quaternary ammonium hydroxide and quaternary phosphonium hydroxide.

Examples of the carbonates of alkali metals include lithium carbonate, sodium carbonate and potassium carbonate.

—Antiseptic/Antifungal Agent—

Examples of the antiseptic/antifungal agent include sodium dehydroacetate, sodium sorbate, sodium 2-pyridinethiol-1-oxide, sodium benzoate and sodium pentachlorophenol.

—Chelating Reagent—

Examples of the chelating reagent include sodium ethylenediamine tetraacetate, sodium nitrilotriacetate, sodium hydroxyethylethylenediamine triacetate, sodium diethylenetriamine pentaacetate and sodium uramil diacetate.

—Antirust Agent—

Examples of the antirust agent include acid sulfites, sodium thiosulfate, ammonium thiodiglycolate, diisopropylammonium nitrate, pentaerythritol tetranitrate and dicyclohexylammonium nitrate.

—Antioxidant—

Examples of the antioxidant include phenolic antioxidants (including hindered phenol antioxidants), amine antioxidants, sulfur antioxidants and phosphorus antioxidants.

Examples of the phenolic antioxidants (including hindered phenol antioxidants) include butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis[1,1-dimethyl-2-[β-(3-tert-butyl-4-hydroxy-5-methyphenyl)propionyloxy]ethyl]-2,4,8,10-tetraoxaspiro[5.5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene and tetrakis[methylene-3-(3',5'-di-tert-butyl-4'-hydroxyphenyl)propionate]methane.

Examples of the amine antioxidants include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butyl hydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3-(3,5-di-tert-butyl-4-dihydroxyphenyl)propionate]methane and 1,1,3-tris(2-methyl-4-hydroxy-5-tert-butylphenyl)butane.

Examples of the sulfur antioxidants include dilauryl 3,3'-thiodipropionate, distearyl thiodipropionate, lauryl stearyl thiodipropionate, dimyristyl-3,3'-thiodipropionate, distearyl β,β'-thiodipropionate, 2-mercaptobenzimidazole and dilauryl sulfide.

Examples of the phosphorus antioxidants include triphenyl phosphite, octadecyl phosphite, triisodecyl phosphite, trilauryl trithiophosphite and trinonylphenyl phosphite.

—UV Absorber—

Examples of the UV absorber include benzophenone UV absorbers, benzotriazole UV absorbers, salicylate UV absorbers, cyanoacrylate UV absorbers and nickel complex salt UV absorbers.

Examples of the benzophenone UV absorbers include 2-hydroxy-4-n-octoxybenzophenone, 2-hydroxy-4-n-dodecyloxybenzophenone, 2,4-dihydroxybenzophenone, 2-hydroxy-4-methoxybenzophenone and 2,2',4,4'-tetrahydroxybenzophenone.

Examples of the benzotriazole UV absorbers include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole and 2-(2'-hydroxy-3'-tert-butyl-5'-methylphenyl)-5-chlorobenzotriazole.

Examples of the salicylate UV absorbers include phenyl salicylate, p-tert-butylphenyl salicylate and p-octylphenyl salicylate.

Examples of the cyanoacrylate UV absorbers include ethyl-2-cyano-3,3'-diphenyl acrylate, methyl-2-cyano-3-methyl-3-(p-methoxyphenyl)acrylate and butyl-2-cyano-3-methyl-3-(p-methoxyphenyl)acrylate.

Examples of the nickel complex salt UV absorbers include nickel bis(octylphenyl) sulfide, 2,2'-thiobis(4-tert-octylphelate)-n-butylamine nickel(II), 2,2'-thiobis(4-tert-octylphelate)-2-ethylhexylamine nickel(II) and 2,2'-thiobis(4-tert-octylphelate)triethanolamine nickel(II).

The inkjet recording ink according to the first embodiment is not particularly limited and may be appropriately selected depending on the intended purpose. It is produced as follows, for example. Specifically, a first pigment dispersion, a second pigment dispersion, water and a penetrating agent, and other optional ingredients are mixed together with stirring using, for example, a sand mill, a ball mill, a roll mill, a bead mill, a nanomizer, a homogenizer or an ultrasonic disperser, and then coarse particles are filtrated with, for example, a filter or a centrifugal separator, followed by optional degassing.

The amount of the pigment contained in the inkjet recording ink contained according to the first embodiment is not particularly limited and may be appropriately selected depending on the intended purpose, but is preferably 1% by mass to 20% by mass. When it is less than 1% by mass, the image density is low to lower the vividness of printed characters. Whereas when it is more than 20% by mass, the viscosity of the obtained ink tends to be higher as well as nozzle clogging is likely to occur.

The amount of the water-soluble organic solvent contained in the inkjet recording ink according to the first embodiment (i.e., the total amount of the penetrating agent and the wetting agent) is not particularly limited and may be appropriately selected depending on the intended purpose, but is preferably less than 50% by mass, more preferably 5% by mass to 40% by mass, further preferably 10% by mass to 35% by mass.

If necessary, the ink may contain similar additives to the materials described as the additives for the pigment dispersion.

(Inkjet Recording Ink According to the Second Embodiment)

The inkjet recording ink according to the second embodiment of the present invention contains oxidized carbon black that has been oxidized with ozone, a compound expressed by the chemical formula: $CH_3OCH_2CH_2CON(CH_3)_2$, and water; and, if necessary, further contains other ingredients.

Unless the inkjet recording ink contains the oxidized carbon black oxidized with ozone, it is degraded in image density on plain paper, storage stability, ejection stability and adhesion resistance. Also, unless the inkjet recording ink contains the compound expressed by the chemical formula: $CH_3OCH_2CH_2CON(CH_3)_2$ (i.e., 3-methoxy-N,N-dimethylpropionamide), it is degraded in storage stability, ejection stability, adhesion resistance and drying property.

<Oxidized Carbon Black Oxidized with Ozone>

The oxidized carbon black preferably has a volatile content of 10% to 20%, preferably 12% to 18%. When the volatile content of the oxidized carbon black is less than 10% or more than 20%, the obtained ink may be degraded in storage stability, ejection stability and adhesion resistance.

The volatile content of the oxidized carbon black can be measured by the measurement method described in, for example, DIN 53552.

The oxidized carbon black has a BET specific surface area of 90 $m^2$/g to 150 $m^2$/g, preferably 100 $m^2$/g to 140 $m^2$/g. When the BET specific surface area of the oxidized carbon black is less than 90 $m^2$/g or more than 150 $m^2$/g, storage stability, the obtained ink may be degraded in storage stability, ejection stability and adhesion resistance.

The BET specific surface area of the oxidized carbon black can be measured by the measurement method described in, for example, DIN 66132.

The oxidized carbon black can be obtained by ozone-oxidizing carbon black having a BET specific surface area of 90 $m^2/g$ to 150 $m^2/g$ so as to adjust its volatile content to fall within the range of 10% to 20%.

The method of ozone-oxidizing carbon black is not particularly limited and may be appropriately selected depending on the intended purpose. Examples thereof include a method where carbon black is exposed to ozone flowing.

The volatile content of the oxidized carbon black can be increased by increasing the amount of ozone flowing or extending the time for which ozone flows.

Carbon black to be oxidized with ozone is not particularly limited and may be appropriately selected depending on the intended purpose. It preferably has an oil absorption amount of 230 g/100 or more in terms of image density.

The oil absorption amount of the carbon black can be measured according to the DIN ISO 787/5 method.

The carbon black to be oxidized with ozone is not particularly limited and may be appropriately selected depending on the intended purpose. Examples thereof include furnace black, lamp black, acetylene black and gas black, with gas black being preferred in terms of image density.

The carbon black to be oxidized with ozone is not particularly limited and may be appropriately selected depending on the intended purpose, but preferably has an average primary particle diameter of 13 nm to 30 nm.

The oxidized carbon black is preferably neutralized with a base. This can further improve the storage stability and the ejection stability of the ink.

The base is not particularly limited and may be appropriately selected depending on the intended purpose. Examples thereof include alcohol amines such as diethanol amine, triethanol amine and 2-amino-2-ethyl-1,3-propanediol; hydroxides of alkali metals such as lithium hydroxide, sodium hydroxide and potassium hydroxide; hydroxides of ammonium such as ammonium hydroxide, quaternary ammonium hydroxide; hydroxides of phosphonium such as quaternary phosphonium hydroxide; and carbonates of alkali metals such as lithium carbonate, sodium carbonate and potassium carbonate. Among them, in terms of image density on plain paper, hydroxides of alkali metals are preferred with potassium hydroxide being further preferred.

Alkali metal ions generated as a result of neutralization of the oxidized carbon black with the hydroxides of alkali metals can be analyzed through, for example, ICP optical emission spectrometry or ion chromatography.

When the oxidized carbon black is neutralized with the base, the oxidized carbon black is dispersed in water in an amount of 10% by mass to 25% by mass and then is neutralized with the base so as to have a pH of 6 to 8.

The amount of the oxidized carbon black contained in the inkjet recording ink according to the second embodiment is not particularly limited and may be appropriately selected depending on the intended purpose, but is preferably 1% by mass to 20% by mass. When it is less than 1% by mass, the image density of the ink may decrease. Whereas when it is more than 20% by mass, the ejection stability of the ink may decrease.

<Compound Expressed by Chemical Formula: $CH_3OCH_2CH_2CON(CH_3)_2$>

The compound expressed by the chemical formula: $CH_3OCH_2CH_2CON(CH_3)_2$ has the function of a wetting agent.

The amount of the 3-methoxy-N,N-dimethylpropionamide contained in the inkjet recording ink according to the second embodiment is not particularly limited and may be appropriately selected depending on the intended purpose, but is preferably 1% by mass to 50% by mass, more preferably 2% by mass to 40% by mass, further preferably 5% by mass to 30% by mass. When it is less than 1% by mass, the ejection stability and the adhesion resistance may decrease. Whereas when it is more than 50% by mass, the ejection stability and the drying property may decrease.

The inkjet recording ink according to the second embodiment of the present invention may contain other wetting agents than the 3-methoxy-N,N-dimethylpropionamide.

The other wetting agents than the 3-methoxy-N,N-dimethylpropionamide are not particularly limited and may be appropriately selected depending on the intended purpose. Examples thereof include similar wetting agents to those of the inkjet recording ink according to the first embodiment.

The inkjet recording ink according to the second embodiment of the present invention may further contain, for example, oxidized carbon black other than the oxidized carbon black that has been oxidized with ozone, carbon black coated with resin, carbon black treated to be grafted, carbon black treated to be encapsulated, and/or commonly-used carbon black.

The average particle diameter of the oxidized carbon black in the inkjet recording ink is not particularly limited and may be appropriately selected depending on the intended purpose, but is preferably 90 nm to 1,500 nm.

The average particle diameter of the oxidized carbon black in the inkjet recording ink can be measured with, for example, a transmission electron microscope H-7000 (product of Hitachi, Ltd.).

The method for controlling the average particle diameter of the oxidized carbon black in the inkjet recording ink is not particularly limited and may be appropriately selected depending on the intended purpose. Examples thereof include: a method where the oxidized carbon black is dispersed in water using a disperser to prepare an oxidized carbon black dispersion; and a method where the inkjet recording ink is dispersed using a disperser. Among them, the former method of preparing an oxidized carbon black dispersion is preferred since it is easy to control the average particle diameter of the oxidized carbon black in the inkjet recording ink.

The disperser is not particularly limited and may be appropriately selected depending on the intended purpose. Examples thereof include a sand mill, a ball mill, a roll mill, a bead mill, a nanomizer, a homogenizer and an ultrasonic disperser.

The amount of the oxidized carbon black when preparing the oxidized carbon black dispersion is not particularly limited and may be appropriately selected depending on the intended purpose, but is preferably 0.1% by mass to 50% by mass, more preferably 0.1% by mass to 30% by mass.

The oxidized carbon black dispersion is obtained as follows. Specifically, the oxidized carbon black is dispersed in water and then coarse particles are filtrated with, for example, a filter or a centrifugal separator, followed by optional degassing.

<Water>

The water is, for example, similar ones described for the inkjet recording ink according to the first embodiment.

<Other Ingredients>

The inkjet recording ink of the present invention may optionally contain, as the other ingredients, a water-dispersible resin, a surfactant, a penetrating agent, a pH adjuster, an antiseptic/antifungal agent, a chelating reagent, an antirust agents, an antioxidant and/or a UV absorber.

—Water-Dispersible Resin—

The water-dispersible resin may form in water any of mon-layered emulsion, core-shell emulsion and power feed emulsion.

The water-dispersible resin is not particularly limited and may be appropriately selected depending on the intended purpose. Examples thereof include: condensation synthetic resins such as polyesters, polyurethanes, epoxy resins, polyamides, polyethers, (meth)acryl resins, acryl-silicone reins and fluororesins; addition synthetic resins such as polyolefins, polystyrene resins, polyvinyl alcohol resins, polyvinyl ester resins, polyacrylic acid resins and unsaturated carboxylic acid resins; and naturally occurring polymers such as cellulose, rosin and natural rubber. These may be used alone or in combination. Among them, fluororesins are preferred.

—Surfactant—

The surfactant is not particularly limited and may be appropriately selected depending on the intended purpose. Examples thereof include similar ones to those described in the inkjet recording ink according to the first embodiment.

The amount of the surfactant contained in the inkjet recording ink according to the second embodiment is not particularly limited and may be appropriately selected depending on the intended purpose, but is preferably 0.01% by mass to 3.0% by mass, more preferably 0.5% by mass to 2% by mass. When it is less than 0.01% by mass, the leveling property of the inkjet recording ink may decrease. Whereas when it is more than 3.0% by mass, the image density of the inkjet recording ink may decrease.

—Penetrating Agent—

The penetrating agent is not particularly limited and may be appropriately selected depending on the intended purpose. Examples thereof include similar ones to those described in the inkjet recording ink according to the first embodiment.

The amount of the penetrating agent contained in the inkjet recording ink according to the second embodiment is not particularly limited and may be appropriately selected depending on the intended purpose, but is preferably 0.1% by mass to 4.0% by mass. When it is less than 0.1% by mass, the quick drying property of the inkjet recording ink may decrease. Whereas when it is more than 4.0% by mass, the ejection stability and the image density of the inkjet recording ink may decrease. —pH Adjuster, Antiseptic/Antifungal Agent, Chelating Reagent, Antirust Agent, Antioxidant, UV Absorber—

The pH adjuster, the antiseptic/antifungal agent, the chelating reagent, the antirust agent, the antioxidant and the UV absorber are not particularly limited and may be appropriately selected depending on the intended purpose. Examples thereof include similar ones to the pH adjusters, the antiseptic/antifungal agents, the chelating reagents, the antirust agents, the antioxidants and the UV absorbers of the inkjet recording ink according to the first embodiment.

The inkjet recording ink according to the second embodiment of the present invention is produced as follows. Specifically, a composition containing a dispersion of the ozone-oxidized carbon black, 3-methoxy-N,N-dimethylpropionamide and water is mixed with stirring and then coarse particles are filtrated with, for example, a filter or a centrifugal separator, followed by optional degassing.

The disperser is not particularly limited and may be appropriately selected depending on the intended purpose. Examples thereof include a sand mill, a ball mill, a roll mill, a bead mill, a nanomizer, a homogenizer and an ultrasonic disperser.

The inkjet recording ink according to each of the first and second embodiments of the present invention may be used as a cartridge with housed in a container.

The method for printing characters includes continuously-spraying methods and on-demand methods, and the on-demand methods include piezo mode, thermal mode and electrostatic mode.

The inkjet recording ink can be used in inkjet recording apparatuses such as inkjet printers, facsimiles, copiers, printer/fax/copier complex machines.

One example of the inkjet recording method or the inkjet recording apparatus used in the present invention will next be described with reference to the drawings.

First, description will be given to the inkjet recording apparatus used in the present invention.

An inkjet recording apparatus in FIG. 1 includes an apparatus main body 101, a paper feed tray 102 for feeding paper into the apparatus main body 101, a paper discharge tray 103 for storing paper which has been fed into the apparatus main body 101 and on which images have been recorded (formed), and an ink cartridge loading section 104. An operation unit 105 composed of, for example, operation keys and a display is placed on the upper surface of the ink cartridge loading section 104. The ink cartridge loading section 104 has a front cover 115 capable of opening and closing to attach and detach the ink cartridge 200. Reference numeral 111 denotes a top cover and reference numeral 112 denotes a front face of the front cover.

Figure 2:
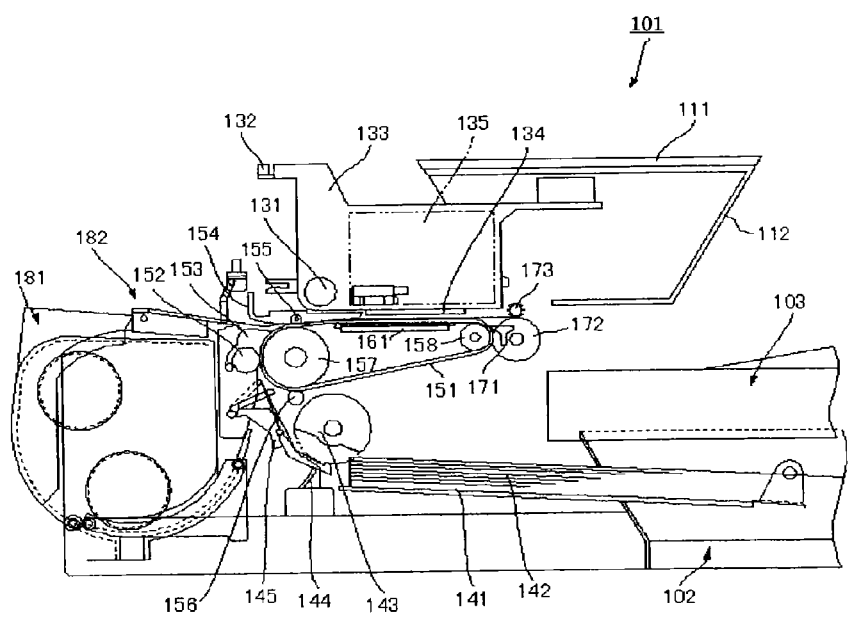
FIG. 2 is a schematic cross-sectional view of one example of an inkjet recording apparatus used in the present invention.

In the apparatus main body 101, as shown in FIG. 2, a carriage 133 is freely slidably held in the main scanning direction by a guide rod 131, which is a guide member laterally passed between left and right side plates, and a stay 132; and the carriage 133 is moved for scanning by a main scanning motor.

A recording head 134 composed of four inkjet recording heads which eject recording ink droplets of yellow (Y), cyan (C), magenta (M) and black (Bk) is installed in the carriage 133 such that a plurality of ink ejection outlets are aligned in the direction intersecting the main scanning direction and that the ink droplet ejection direction faces downward.

For each of the inkjet recording heads composing the recording head 134, it is possible to use, for example, a head provided with any of the following actuators as a energy-generating unit for ejecting ink: a piezoelectric actuator such as a piezoelectric element, a thermal actuator that uses a thermoelectric conversion element such as an exothermic resistive element and utilizes phase change caused by film boiling of a liquid, a shape-memory-alloy actuator that utilizes metal phase change caused by temperature change, and an electrostatic actuator that utilizes electrostatic force.

Also, the carriage 133 incorporates sub-tanks 135 of each color for supplying the inks of each color to the recording head 134. Each sub-tank 135 is supplied and replenished with the inkjet recording ink according to at least one of the above-described first and second embodiments of the present invention from the ink cartridge 200 of the present invention loaded into the ink cartridge loading section 104, via an ink supply tube.

Meanwhile, as a paper feed unit for feeding sheets of paper 142 loaded on a paper loading section (pressure plate) 141 of the paper feed tray 102, there are provided a half-moon roller (paper feed roller 143) which feeds the sheets of paper 142 one by one from the paper loading section 141, and a separation pad 144 which faces the paper feed roller 143 and is formed of a material with a large friction coefficient. This separation pad 144 is biased toward the paper feed roller 143 side.

As a conveyance unit for conveying the paper 142, which has been fed from this paper feed unit, under the recording head 134, there are provided a conveyance belt 151 for conveying the paper 142 by means of electrostatic adsorption; a counter roller 152 for conveying the paper 142, which is sent from the paper feed unit via a guide 145, such that the paper 142 is sandwiched between the counter roller 152 and the conveyance belt 151; a conveyance guide 153 for making the paper 142, which is sent upward in the substantially vertical direction, change its direction by approximately 90° and thusly correspond with the conveyance belt 151; and an end pressurizing roller 155 biased toward the conveyance belt 151 side by a pressing member 154. Also, there is provided a charging roller 156 as a charging unit for charging the surface of the conveyance belt 151.

The conveyance belt 151 is an endless belt and is capable of moving in circles in the belt conveyance direction, with being wound around a conveyance roller 157 and a tension roller 158 in a stretched manner. The conveyance belt 151 has, for example, a surface layer serving as a paper adsorbing surface, that is formed of a resinous material such as an ethylene-tetrafluoroethylene copolymer (ETFE) having a thickness of approximately 40 μm for which resistance control has not been conducted, and a back layer (intermediate resistance layer, ground layer) that is formed of the same material as this surface layer, for which resistance control has been conducted using carbon. On the back of the conveyance belt 151, a guide member 161 is placed correspondingly to a region where printing is performed by the recording head 134. Additionally, as a paper discharge unit for discharging the paper 142 on which images have been recorded by the recording head 134, there are provided a separation pawl 171 for separating the paper 142 from the conveyance belt 151, a paper discharge roller 172 and a paper discharge small roller 173, with the paper discharge tray 103 being placed below the paper discharge roller 172.

A double-sided paper feed unit 181 is mounted on a rear surface portion of the apparatus main body 101 in a freely detachable manner. The double-sided paper feed unit 181 takes in the paper 142 returned by rotation of the conveyance belt 151 in the opposite direction and reverses it, then refeeds it between the counter roller 152 and the conveyance belt 151. Additionally, a manual paper feed unit 182 is provided on an upper surface of the double-sided paper feed unit 181.

In this inkjet recording apparatus, the sheets of paper 142 are fed one by one from the paper feed unit, and the paper 142 fed upward in the substantially vertical direction is guided by the guide 145 and conveyed between the conveyance belt 151 and the counter roller 152. Furthermore, the conveyance direction of the paper 142 is changed by approximately 90°, as an end of the paper 142 is guided by the conveyance guide 153 and pressed onto the conveyance belt 151 by the end pressurizing roller 155.

On this occasion, the conveyance belt 151 is charged by the charging roller 156, and the paper 142 is electrostatically adsorbed onto the conveyance belt 151 and thusly conveyed. Here, by driving the recording head 134 according to image signals while moving the carriage 133, ink droplets are ejected onto the paper 142 having stopped so as to perform recording for one line, and after the paper 142 is conveyed by a predetermined distance, recording for the next line is performed. On receipt of a recording completion signal or such a signal as indicates that the rear end of the paper 142 has reached the recording region, recording operation is finished, and the paper 142 is discharged onto the paper discharge tray 103.

Once the amount of ink remaining in the sub-tanks 135 has been detected as too small, a required amount of ink is supplied from the ink cartridge 200 into the sub-tanks 135.

As to this inkjet recording apparatus, when ink in the ink cartridge 200 has been used up, it is possible to replace only the ink bag inside the ink cartridge 200 by dismantling the housing of the ink cartridge 200. Also, even when the ink cartridge 200 is longitudinally placed and employs a front-loading structure, it is possible to supply ink stably. Therefore, even when the apparatus main body 101 is installed with little space over it, for example when the apparatus main body 101 is stored in a rack or when an object is placed over the apparatus main body 101, it is possible to replace the ink cartridge 200 with ease.

It should be noted that although the inkjet recording method of the present invention has been described referring to an example in which it is applied to a serial-type (shuttle-type) inkjet recording apparatus where a carriage performs scanning, the inkjet recording method of the present invention can also be applied to line-type inkjet recording apparatuses provided with line-type heads.

—Ink Cartridge—

The inkjet recording ink according to at least one of the above-described first and second embodiments of the present invention may be used as an ink cartridge with housed in a container. The ink cartridge may optionally be provided with other members that are appropriately selected.

The container is not particularly limited and the shape, structure, size and material thereof may be appropriately selected depending on the intended purpose. Suitable examples thereof include a container having an ink bag formed of, for example, an aluminum laminated film or a resin film.

Figure 3:
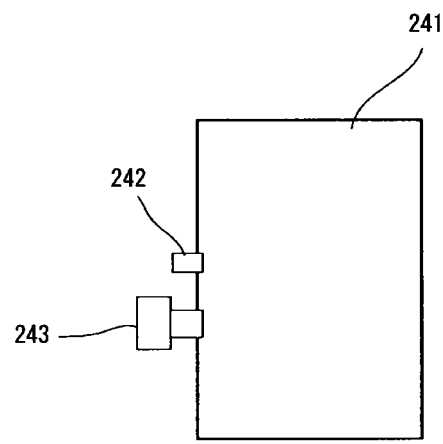
FIG. 3 is a schematic view of one example of an ink bag of an ink cartridge used in the present invention.
Figure 4:
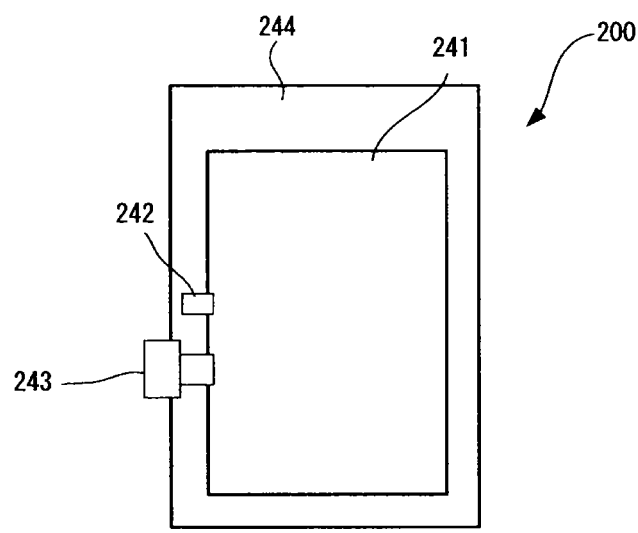
FIG. 4 is a schematic view of an ink cartridge housing an ink bag.

The ink cartridge will be described with reference to FIGS. 3 and 4. FIG. 3 is a schematic view of one exemplary ink bag 241 of the ink cartridge and FIG. 4 is a schematic view of an ink cartridge 200 where the ink bag 241 illustrated in FIG. 3 is housed in a cartridge case 244.

As illustrated in FIG. 3, ink is supplied from an ink inlet 242 into the ink bag 241, and the ink inlet 242 is closed by means of fusion bonding after air remaining the ink bag has been discharged. When the ink cartridge is used, an ink ejection outlet 243 made of a rubber member is pricked with a needle of the apparatus main body, and the ink is thus supplied to the apparatus. The ink bag 241 is formed of an air-impermeable packing member such as an aluminum laminated film. As illustrated in FIG. 4, this ink bag is normally housed in a plastic cartridge case 244 and detachably mounted as the ink cartridge 200 on a variety of inkjet recording apparatuses.

It is particularly preferable that the ink cartridge is detachably mounted on the above-described inkjet recording apparatus used in the present invention.

<Ink Recorded Matter>

An ink recorded matter used in the present invention includes a recording medium and an image formed on the recording medium using the inkjet recording ink according to at least one of the above-described first and second embodiments of the present invention.

The recording medium is not particularly limited and may be appropriately selected depending on the intended purpose. Examples thereof include plain paper, glossy paper, special paper, cloth, films and OHP sheets. These may be used alone or in combination.

The ink recorded matter is high in image quality, free of bleeding and superior in stability over time and can be suitably used for a variety of purposes as a material on which letters/characters or images of any type are recorded.

EXAMPLES

The present invention will next be described in detail by way of Examples and Comparative Examples. However, the present invention should not be construed as being limited to Examples.

In Examples and Comparative Examples, pigment dispersions were prepared and used to produce inks. Notably, the units "part(s)" and "%" in Examples and Comparative Examples are on the mass basis.

Next, description will be given to Examples using the inkjet recording ink according to the first embodiment.

Example A1

<Production of Oxidized Carbon Black (1)>

Carbon black PRINTEX-U (product of Degussa Co., Ltd.) (200 g) was placed in a hollow-cylindrical ozone treating device, and ozone was generated at 6 g/h using an ozone generator (product of KOTOHIRA KOGYO CO., LTD., KQS-120). In an ozone atmosphere, the carbon black was subjected to oxidation treatment for 2 hours while the treatment temperature being kept at about 30° C., to thereby obtain oxidized carbon black (1).

Through measurements, the obtained oxidized carbon black (1) was found to have a CB volatile content of 10% and a BET specific surface area of 110 m²/g.

<Preparation of Pigment Dispersion (1-1)>

Oxidized carbon black (1): 20.0 parts
Distilled water: 70.0 parts

A mixture of the above materials was adjusted in pH to 7.0 with a 20% aqueous NaOH solution. Thereafter, distilled water was added to the resultant dispersion so that the total amount thereof was 100 parts.

The amount of the 20% aqueous NaOH solution was 1.2 parts.

The materials in the above amounts were pre-mixed and then dispersed for 5 min with a disc-type bead mill (product of Shinmaru Enterprises Corporation, KDL-model batch type) containing zirconia beads 0.3 mm in diameter at a circumference speed of 10 m/s and a liquid temperature of 10° C.

Coarse particles were separated therefrom using a centrifugal separator (product of KUBOTA Corporation, Model-3600) to thereby obtain a pigment dispersion (1-1) of carbon black having an average particle diameter of about 125 nm and a standard deviation of 60.2 nm.

<Preparation of Pigment Dispersion (2-1)>

Carbon black NIPEX150: 200 parts
(product of Degussa Co., Ltd., gas black)
Sodium naphthalenesulfonate-formalin condensate: 50 parts
(product of TAKEMOTO OIL & FAT CO., LTD., A-45-PN) (the total amount of dimer, trimer and tetramer of naphthalenesulfonic acid: 20%)
Distilled water: 750 parts A mixture of the above materials was pre-mixed and then dispersed for 40 min with a bead mill disperser (product of KOTOBUKI INDUSTRIES CO., LTD., UAM-015) containing zirconia beads 0.03 mm in diameter (density: 6.03×10⁻⁶ g/m³) at a circumference speed of 10 m/s and a liquid temperature of 25° C. Coarse particles were separated therefrom using a centrifugal separator (product of KUBOTA Corporation, Model-3600) to thereby obtain a pigment dispersion (2-1) as shown in Table A1-1 containing carbon black having an average particle diameter of 50.4 nm and a standard deviation of 18.3 nm.

<Preparation of an Ink of Example A1>

The following materials were mixed and stirred together for 30 min at the following formulation for preparing an ink of Example A1.

(Formulation of an Ink of Example A1)
Pigment dispersion (1-1) (pigment concentration: 20%): 4.0 parts
Pigment dispersion (2-1) (pigment concentration: 20%): 36.0 parts
Glycerin: 5.5 parts
1,3-Butanediol: 16.5 parts
2-Ethyl-1,3-hexanediol: 2.0 parts
Fluorosurfactant (solid content: 40%): 2.5 parts
(product of DuPont Co., Ltd., ZONYL FS-300)
Fluoroethylene-vinyl ether block copolymer (solid content: 50%): 6.0 parts
(product of ASAHI GLASS CO., LTD., LUMIFLON FE4300, average particle diameter: 150 nm, MFT: ≤30° C.)
Distilled water: 27.4 parts Thereafter, the resultant mixture was adjusted in pH to 10 with 0.1 parts of 2-amino-2-ethyl-1,3-propanediol (40% aqueous solution), followed by mixing and stirring for 30 min, to thereby prepare an ink of Example A1.

Examples A2 to A9

<Oxidized Carbon Blacks (2) to (9)>

Oxidized carbon blacks (2) to (9) were produced in the same manner as in the production of the oxidized carbon black (1) in Example A1 except that the carbon black PRINTEX-U (product of Degussa Co., Ltd.) was changed to pre-oxidized carbon blacks as shown in Table A1-1 and that the amount of ozone generated and the treating time were adjusted to adjust the volatile content.

<Pigment Dispersions (1-2) to (1-9)>

Pigment dispersions (1-2) to (1-9) as shown in Table A1-1 were prepared in the same manner as in the preparation of the pigment dispersion (1-1) in Example A1 except that the oxidized carbon black (1) was changed to each of the oxidized carbon blacks (2) to (9) and that the amount of the aqueous NaOH solution added was adjusted to adjust the pH of each dispersion to 7.

<Preparations of Pigment Dispersions (2-2) and (2-3)>

Pigment dispersions (2-2) and (2-3) as shown in Tables A1-1 and A1-2 were prepared in the same manner as in the preparation of the pigment dispersion (2-1) except that the dispersing agent was changed to a dispersing agent in which the total amount of dimer, trimer and tetramer of naphthalenesulfonic acid was 50% or 80%.

<Preparation of Inks of Examples A2 to A9>

Inks of Examples A2 to A9 as shown in Table A1-1 were prepared in the same manner as in the ink of Example A1 except that the pigment dispersion (1-1) (pigment concentration: 20%) was changed to each of the pigment dispersions (1-2) to (1-9) (pigment concentration: 20%), that the pigment dispersion (2-1) (pigment concentration: 20%) was changed to each of the pigment dispersions (2-2) and (2-3) (pigment concentration: 20%) and that the ratio of the pigment dispersion (1) to the pigment dispersion (2) was changed as shown in Table A1-1 with the total amount of the pigment dispersions (1) and (2) being maintained.

Examples A10 and A11

<Preparation of Pigment Dispersions (1-10) and (1-11)>

Pigment dispersions (1-10) and (1-11) were prepared in the same manner as in the preparation of the pigment dispersion (1-1) in Example A1 except that the oxidized carbon black (1)

was changed to the oxidized carbon black (2) and that the amount of the aqueous NaOH solution added was adjusted to adjust the pH of each dispersion to a value as shown in Table A1-1.

<Preparation of Pigment Dispersion (2-4)>

Pigment dispersion (2-4) as shown in Table A1-1 was prepared in the same manner as in the preparation of the pigment dispersion (2-2) except that the dispersing time was adjusted so that the carbon black dispersed therein had an average particle diameter of 131.8 nm and a standard deviation of 55.1 nm.

<Preparation of Inks of Examples A10 and A11>

Inks of Examples A10 and A11 as shown in Table A1-1 were prepared in the same manner as in the ink of Example A2 except that the pigment dispersion (1-2) (pigment concentration: 20%) was changed to each of the pigment dispersions (1-10) and (1-11) (pigment concentration: 20%) and that the pigment dispersion (2-2) (pigment concentration: 20%) was changed to the pigment dispersion (2-4) (pigment concentration: 20%).

Example A12

<Preparation of Pigment Dispersion (1-12)>
(Formulation of Pigment Dispersion (1-12))
  Oxidized carbon black (1): 20.0 parts
  Distilled water: 70.0 parts A mixture of the above materials was adjusted in pH to 7.0 with a 20% aqueous NaOH solution. Thereafter, distilled water was added to the resultant dispersion so that the total amount thereof was 93 parts. The amount of the 20% aqueous NaOH solution was 1.2 parts.

The materials in the above amounts were pre-mixed and then dispersed for 5 min with a disc-type bead mill (product of Shinmaru Enterprises Corporation, KDL-model batch type) containing zirconia beads 0.3 mm in diameter at a circumference speed of 10 m/s and a liquid temperature of 10° C. Next, 7.0 parts of a polyether-type polyurethane resin (product of Mitsui Chemicals, Inc., acid value: 80 mgKOH/g, solid content: 28%) was added to the resultant dispersion, followed by thoroughly stirring. Coarse particles were separated therefrom using a centrifugal separator (product of KUBOTA Corporation, Model-3600) to thereby obtain a pigment dispersion (1-12) of carbon black as shown in Tables A1-1 and A1-2.

<Preparation of an Ink of Example A12>

The following materials were mixed and stirred together for 30 min at the following proportion for preparing an ink of Example A12.

(Formulation of an Ink of Example A12)
  Pigment dispersion (1-12) (pigment concentration: 20%): 4.0 parts
  Pigment dispersion (2-1) (pigment concentration: 20%): 36.0 parts
  Glycerin: 5.5 parts
  1,3-Butanediol: 16.5 parts
  2-Ethyl-1,3-hexanediol: 2.0 parts
  Fluorosurfactant (solid content: 40%): 2.5 parts
(product of DuPont Co., Ltd., ZONYL FS-300)
  Fluoroethylene-vinyl ether block copolymer (solid content: 50%): 6.0 parts
(product of ASAHI GLASS CO., LTD., LUMIFLON FE4300, average particle diameter: 150 nm, MFT:≤30° C.)
  Distilled water: 27.4 parts Thereafter, the resultant mixture was adjusted in pH to 10 with 0.1 parts of 2-amino-2-ethyl-1,3-propanediol (40% aqueous solution), followed by mixing and stirring for 30 min, to thereby prepare an ink of Example A12.

Examples A13 to A20

<Production of Oxidized Carbon Blacks (13) to (20)>

Oxidized carbon blacks (13) to (20) were produced in the same manner as in the production of the oxidized carbon black (1) in Example A1 except that the carbon black PRINTEX-U (product of Degussa Co., Ltd.) was changed to pre-oxidized carbon blacks as shown in Tables A1-1 and A1-2 and that the amount of ozone generated and the treating time were adjusted to adjust the volatile content.

<Preparation of Pigment Dispersions (1-13) to (1-20)>

Pigment dispersions (1-13) to (1-20) were prepared in the same manner as in the preparation of the pigment dispersion (1-12) in Example A12 except that the oxidized carbon black (1) was changed to each of the oxidized carbon blacks (13) to (20) and that the amount of the aqueous NaOH solution added was adjusted to adjust the pH of each dispersion to 7.

<Preparation of Inks of Examples A13 to A20>

Inks of Examples A13 to A20 as shown in Tables A1-1 and A1-2 were prepared in the same manner as in the preparation of the ink of Example A12 except that the pigment dispersion (1-12) (pigment concentration: 20%) was changed to each of the pigment dispersions (1-13) to (1-20) (pigment concentration: 20%), that the pigment dispersion (2-1) was changed to pigment dispersions (2) as shown in Tables A1-1 and A1-2, and that the ratio of the pigment dispersion (1) to the pigment dispersion (2) was changed as shown in Tables A1-1 and A1-2 with the total amount of the pigment dispersions (1) and (2) being maintained.

Examples A21 and A22

<Preparation of Pigment Dispersions (1-21) and (1-22)>

Pigment dispersions (1-21) and (1-22) as shown in Table A1-2 were prepared in the same manner as in the preparation of the pigment dispersion (1-12) in Example A12 except that the oxidized carbon black (1) was changed to the oxidized carbon black (2) and the amount of the aqueous NaOH solution added was adjusted to adjust the pH of each dispersion to a value as shown in Table A1-2.

<Preparation of Inks of Examples A21 and A22>

Inks of Examples A21 and A22 as shown in Table A1-2 were prepared in the same manner as in the preparation of the ink of Example A12 except that the pigment dispersion (1-12) (pigment concentration: 20%) was changed to each of the pigment dispersions (1-25) and (1-26) (pigment concentration: 20%), that the pigment dispersion (2-1) was changed to pigment dispersions (2) as shown in Table A1-2, and that the ratio of the pigment dispersion (1) to the pigment dispersion (2) was changed as shown in Table A1-2 with the total amount of the pigment dispersions (1) and (2) being maintained.

Examples A23 to A26

<Preparation of Pigment Dispersions (1-23) to (1-26)>

Pigment dispersions (1-23) to (1-26) as shown in Table A1-2 were prepared in the same manner as in the preparation of the pigment dispersion (1-12) in Example A12 except that the oxidized carbon black (1) was changed to the oxidized carbon black (2), the polyether-type polyurethane resin (product of Mitsui Chemicals, Inc., acid value: 80 mgKOH/g, solid content: 28%) was changed to polyether-type polyurethane resins having acid values as shown in Table A1-2 (product of Mitsui Chemicals, Inc., solid content: 28%, diluted products) and that the amount of the aqueous NaOH solution added was adjusted to adjust the pH of each dispersion to a value as shown in Table A1-2.

<Preparation of Inks of Examples A23 to A26>

Inks of Examples A23 and A26 as shown in Table A1-2 were prepared in the same manner as in the preparation of the ink of Example A12 except that the pigment dispersion (1-12) (pigment concentration: 20%) was changed to each of the pigment dispersions (1-23) and (1-26) (pigment concentration: 20%), that the pigment dispersion (2-1) was changed to pigment dispersions (2) as shown in Table A1-2, and that the ratio of the pigment dispersion (1) to the pigment dispersion (2) was changed as shown in Table A1-2 with the total amount of the pigment dispersions (1) and (2) being maintained.

Example A27

<Preparation of Pigment Dispersion (1-27)>

A pigment dispersion (1-27) as shown in Table A1-2 was prepared in the same manner as in the preparation of the pigment dispersion (1-12) in Example A12 except that the oxidized carbon black (1) was changed to the oxidized carbon black (2), that the aqueous NaOH solution (20%) was changed to a 20% aqueous LiOH solution (20%) and its amount was adjusted to adjust the pH of the dispersion to a value as shown in Table A1-2.

<Preparation of an Ink of Example A27>

An ink of Example A27 as shown in Table A1-2 was prepared in the same manner as in the preparation of the ink of Example A12 except that the pigment dispersion (1-12) (pigment concentration: 20%) was changed to the pigment dispersions (1-27) (pigment concentration: 20%), that the pigment dispersion (2-1) was changed to a pigment dispersion (2) as shown in Table A1-2, and that the ratio of the pigment dispersion (1) to the pigment dispersion (2) was changed as shown in Table A1-2 with the total amount of the pigment dispersions (1) and (2) being maintained.

Example A28

<Preparation of Pigment Dispersion (2-5)>

A pigment dispersion (2-5) as shown in Table A1-2 was prepared in the same manner as in the preparation of the pigment dispersion (2-1) except that the dispersing agent of the pigment dispersion (2-1) was changed to naphthalenesulfonic acid in which the total amount of dimer, trimer and tetramer of naphthalenesulfonic acid was 10%.

<Preparation of an Ink of Example A28>

An ink of Example A28 was prepared in the same manner as in Example A12 except that the pigment dispersion (2-1) was changed to the pigment dispersion (2-5).

Example A29

<Preparation of Pigment Dispersion (2-6)>

A pigment dispersion (2-6) as shown in Table A1-2 was prepared in the same manner as in the preparation of the pigment dispersion (2-1) except that the dispersing agent of the pigment dispersion (2-1) was changed to naphthalenesulfonic acid in which the total amount of dimer, trimer and tetramer of naphthalenesulfonic acid was 90%.

<Preparation of an ink of Example A29>

An ink of Example A29 was prepared in the same manner as in Example A12 except that the pigment dispersion (2-1) was changed to the pigment dispersion (2-6).

Comparative Examples A1 to A10

<Production of Oxidized Carbon Blacks (30) to (39)>

Oxidized carbon blacks (30) to (39) were produced in the same manner as in the production of the oxidized carbon black (1) in Example A1 except that the carbon black PRINTEX-U (product of Degussa Co., Ltd.) was changed to pre-oxidized carbon blacks as shown in Table A2-1 and that the amount of ozone generated and the treating time were adjusted to adjust the volatile content.

<Preparation of Pigment Dispersions (1-30) to (1-39)>

Pigment dispersions (1-30) to (1-39) were prepared in the same manner as in the preparation of the pigment dispersion (1-1) in Example A1 except that the oxidized carbon black (1) was changed to each of the oxidized carbon blacks (30) to (39) and that the amount of the aqueous NaOH solution added was adjusted to adjust the pH of each dispersion to 7.

<Preparation of inks of Comparative Examples A1 to A10>

Inks of Comparative Examples A1 to A10 were prepared in the same manner as in the preparation of the ink of Example A1 except that the pigment dispersion (1-1) (pigment concentration: 20%) was changed to each of the pigment dispersions (1-30) to (1-39) (pigment concentration: 20%).

Comparative Example A11

<Production of Oxidized Carbon Black (40)>

Carbon black PRINTEX-U (product of Degussa Co., Ltd.) (100 g) was mixed with 500 g of distilled water. Under stirring, 1,000 g of a Na hypochlorite liquid (12%) was added dropwise to the resultant mixture, which was then boiled for 6 hours to perform wet oxidation.

The thus-treated mixture was filtrated with a glass fiber filter and further washed with distilled water and dried in a high-temperature bath of 100° C.

Through measurements, the obtained oxidized carbon black (40) was found to have a CB volatile content of 13% and a BET specific surface area of 110 m$^2$/g.

<Preparation of Pigment Dispersion (1-40)>

A pigment dispersion (1-40) was prepared in the same manner as in the preparation of the pigment dispersion (1-1) in Example A1 except that the oxidized carbon black (1) was changed to the oxidized carbon black (40) and that the amount of the aqueous NaOH solution added was adjusted to adjust the pH of the dispersion to 7.

<Preparation of an Ink of Comparative Example A11>

An ink of Comparative Example A11 was prepared in the same manner as in Example A1 except that the pigment dispersion (1-1) (pigment concentration: 20%) was changed to the pigment dispersion (1-40) (pigment concentration: 20%).

Comparative Example A12

<Production of Oxidized Carbon Black (41)>

Carbon black PRINTEX-U (product of Degussa Co., Ltd.) (100 g) was mixed with 500 g of distilled water. Under stirring, 600 g of a Na peroxodisulfate liquid (10%) was added dropwise to the resultant mixture, which was then boiled for 6 hours to perform wet oxidation.

The thus-treated mixture was filtrated with a glass fiber filter and further washed with distilled water and dried in a high-temperature bath of 100° C.

Through measurements, the obtained oxidized carbon black (41) was found to have a CB volatile content of 13% and a BET specific surface area of 110 m$^2$/g.

<Preparation of Pigment Dispersion (1-41)>

A pigment dispersion (1-41) was prepared in the same manner as in the preparation of the pigment dispersion (1-1) in Example A1 except that the oxidized carbon black (1) was changed to the oxidized carbon black (41) and that the amount of the aqueous NaOH solution added was adjusted to adjust the pH of the dispersion to 7.

<Preparation of an Ink of Comparative Example A12>

An ink of Comparative Example A12 was prepared in the same manner as in Example A1 except that the pigment dispersion (1-1) (pigment concentration: 20%) was changed to the pigment dispersion (1-41) (pigment concentration: 20%).

Comparative Examples A13 and A14

<Preparation of Pigment Dispersions (1-42) and (1-43)>

Pigment dispersions (1-42) and (1-43) were prepared in the same manner as in the preparation of the pigment dispersion (1-1) in Example A1 except that the oxidized carbon black (1) was changed to the oxidized carbon black (3) and that the amount of the aqueous NaOH solution added was adjusted to adjust the pH of each dispersion to a value as shown in Table A2-2.

<Preparation of inks of Comparative Examples A13 and A14>

Inks of Comparative Examples A13 and A14 were prepared in the same manner as in the preparation of the ink of Example A1 except that the pigment dispersion (1-1) (pigment concentration: 20%) was changed to each of the pigment dispersions (1-42) and (1-43) (pigment concentration: 20%).

Comparative Examples A15 to A17

<Preparation of inks of Comparative Examples A15 to A17>

Inks of Comparative Examples A15 to A17 were prepared in the same manner as in Examples A1 to A3, respectively, except that the amount of each of the pigment dispersions (1-1) to (1-3) was changed to 40.0 parts.

Comparative Examples A18 to A20

<Preparation of Inks of Comparative Examples A18 to A20>

Inks of Comparative Examples A18 to A20 were prepared in the same manner as in Examples A12 to A14, respectively, except that the amount of each of the pigment dispersions (1-12) to (1-14) was changed to 40.0 parts.

Comparative Examples A21 to A26

<Preparation of Inks of Comparative Examples A21 to A26>

Inks of Comparative Examples A21 to A26 were prepared in the same manner as the preparation of the ink of Example A1 except that the amount of each of the pigment dispersions (2) as shown in Table A3 was changed to 40.0 parts.

Notably, the dispersions 2-7 to 2-9 were prepared respectively by adding, to the dispersions 2-1 to 2-3 respectively, 7.0 parts of a polyether-type polyurethane resin (product of Mitsui Chemicals, Inc., acid value: 80 mgKOH/g, solid content: 28%).

Comparative Examples A27 to A35

<Preparation of inks of Comparative Examples A27 to A35>

Inks of Comparative Examples A27 to A35 were prepared in the same manner as in the preparation of the ink of Example A1 except that the pigment dispersions (1-1) and (2-1) were changed to pigment dispersions (1) and (2) as shown in Table A4.

TABLE A1-1

| | | Pigment dispersion (1) | | | | | | | Pigment dispersion (2) | | | | | |
|---|---|---|---|---|---|---|---|---|---|---|---|---|---|---|
| | Dispersion | Pre-oxidized CB | Oxidized with: | CB volatile content after oxidation | Specific surface area (m²/g) | CB pH | pH adjuster | Urethane acid value | Dispersion | CB | Avg. particle diameter D50 (nm) | sd* | Amount (%) of 2,3,4-mer in dispersing agent | (1)/(2)* (CB ratio) |
| Ex. A1 | 1-1 | PRINTEXU | Ozone | 10% | 110 | 3.0 | 7 NaOH | — | 2-1 | NIPEX150 | 50.4 | 18.3 | 20 | 10/90 |
| Ex. A2 | 1-2 | PRINTEXU | Ozone | 13% | 110 | 2.6 | 7 NaOH | — | 2-2 | NIPEX150 | 101.3 | 32.6 | 50 | 25/75 |
| Ex. A3 | 1-3 | PRINTEXU | Ozone | 20% | 110 | 2.2 | 7 NaOH | — | 2-3 | NIPEX150 | 179.6 | 65.4 | 80 | 50/50 |
| Ex. A4 | 1-4 | NIPEX160 | Ozone | 10% | 150 | 2.8 | 7 NaOH | — | 2-1 | NIPEX150 | 50.4 | 18.3 | 20 | 10/90 |
| Ex. A5 | 1-5 | NIPEX160 | Ozone | 13% | 150 | 2.4 | 7 NaOH | — | 2-2 | NIPEX150 | 101.3 | 32.6 | 50 | 25/75 |
| Ex. A6 | 1-6 | NIPEX160 | Ozone | 20% | 150 | 2.1 | 7 NaOH | — | 2-3 | NIPEX150 | 179.6 | 65.4 | 80 | 50/50 |
| Ex. A7 | 1-7 | PRINTEX140 | Ozone | 10% | 90 | 3.1 | 7 NaOH | — | 2-1 | NIPEX150 | 50.4 | 18.3 | 20 | 10/90 |
| Ex. A8 | 1-8 | PRINTEX140 | Ozone | 13% | 90 | 2.8 | 7 NaOH | — | 2-2 | NIPEX150 | 101.3 | 32.6 | 50 | 25/75 |
| Ex. A9 | 1-9 | PRINTEX140 | Ozone | 20% | 90 | 2.4 | 7 NaOH | — | 2-3 | NIPEX150 | 179.6 | 65.4 | 80 | 50/50 |
| Ex. A10 | 1-10 | PRINTEXU | Ozone | 13% | 110 | 2.6 | 6 NaOH | — | 2-4 | NIPEX150 | 131.8 | 55.1 | 50 | 25/75 |
| Ex. A11 | 1-11 | PRINTEXU | Ozone | 13% | 110 | 2.6 | 8 NaOH | — | 2-4 | NIPEX150 | 131.8 | 55.1 | 50 | 25/75 |
| Ex. A12 | 1-12 | PRINTEXU | Ozone | 10% | 110 | 3.0 | 7 NaOH | 80 | 2-1 | NIPEX150 | 50.4 | 18.3 | 20 | 10/90 |
| Ex. A13 | 1-13 | PRINTEXU | Ozone | 13% | 110 | 2.6 | 7 NaOH | 80 | 2-2 | NIPEX150 | 101.3 | 32.6 | 50 | 25/75 |
| Ex. A14 | 1-14 | PRINTEXU | Ozone | 20% | 110 | 2.2 | 7 NaOH | 80 | 2-3 | NIPEX150 | 179.6 | 65.4 | 80 | 50/50 |
| Ex. A15 | 1-15 | NIPEX160 | Ozone | 10% | 150 | 2.8 | 7 NaOH | 80 | 2-1 | NIPEX150 | 50.4 | 18.3 | 20 | 10/90 |

*"sd" stands for standard deviation and "(1)/(2)" means Pigment dispersion (1)/Pigment dispersion (2).

TABLE A1-2

| | Pigment dispersion (1) | | | | | | | | Pigment dispersion (2) | | | | | Amount (%) of 2,3,4-mer in dispersing agent | (1)/(2)* (CB ratio) |
|---|---|---|---|---|---|---|---|---|---|---|---|---|---|---|---|
| Dispersion | Pre-oxidized CB | Oxidized with: | CB volatile content after oxidation | Specific surface area (m²/g) | CB pH | pH | pH adjuster | Urethane acid value | Dispersion | CB | Avg. particle diameter D50 (nm) | sd* | | | |
| Ex. A16 | 1-16 | NIPEX160 | Ozone | 13% | 150 | 2.4 | 7 | NaOH | 80 | 2-2 | NIPEX150 | 101.3 | 32.6 | 50 | 25/75 |
| Ex. A17 | 1-17 | NIPEX160 | Ozone | 20% | 150 | 2.1 | 7 | NaOH | 80 | 2-3 | NIPEX150 | 179.6 | 65.4 | 80 | 50/50 |
| Ex. A18 | 1-18 | PRINTEX140 | Ozone | 10% | 90 | 3.1 | 7 | NaOH | 80 | 2-1 | NIPEX150 | 50.4 | 18.3 | 20 | 10/90 |
| Ex. A19 | 1-19 | PRINTEX140 | Ozone | 13% | 90 | 2.8 | 7 | NaOH | 80 | 2-2 | NIPEX150 | 101.3 | 32.6 | 50 | 25/75 |
| Ex. A20 | 1-20 | PRINTEX140 | Ozone | 20% | 90 | 2.4 | 7 | NaOH | 80 | 2-3 | NIPEX150 | 179.6 | 65.4 | 80 | 50/50 |
| Ex. A21 | 1-21 | PRINTEXU | Ozone | 13% | 110 | 2.6 | 6 | NaOH | 80 | 2-1 | NIPEX150 | 50.4 | 18.3 | 20 | 10/90 |
| Ex. A22 | 1-22 | PRINTEXU | Ozone | 13% | 110 | 2.6 | 8 | NaOH | 80 | 2-2 | NIPEX150 | 101.3 | 32.6 | 50 | 25/75 |
| Ex. A23 | 1-23 | PRINTEXU | Ozone | 13% | 110 | 2.6 | 7 | NaOH | 40 | 2-3 | NIPEX150 | 179.6 | 65.4 | 80 | 50/50 |
| Ex. A24 | 1-24 | PRINTEXU | Ozone | 13% | 110 | 2.6 | 7 | NaOH | 100 | 2-1 | NIPEX150 | 50.4 | 18.3 | 20 | 10/90 |
| Ex. A25 | 1-25 | PRINTEXU | Ozone | 13% | 110 | 2.6 | 7 | NaOH | 20 | 2-2 | NIPEX150 | 101.3 | 32.6 | 50 | 25/75 |
| Ex. A26 | 1-26 | PRINTEXU | Ozone | 13% | 110 | 2.6 | 7 | NaOH | 120 | 2-3 | NIPEX150 | 179.6 | 65.4 | 80 | 50/50 |
| Ex. A27 | 1-27 | PRINTEXU | Ozone | 13% | 110 | 2.6 | 7 | LiOH | 80 | 2-2 | NIPEX150 | 101.3 | 32.6 | 50 | 25/75 |
| Ex. A28 | 1-12 | PRINTEXU | Ozone | 10% | 110 | 3.0 | 7 | NaOH | 80 | 2-5 | NIPEX150 | 52.6 | 19.3 | 10 | 10/90 |
| Ex. A29 | 1-12 | PRINTEXU | Ozone | 10% | 110 | 3.0 | 7 | NaOH | 80 | 2-6 | NIPEX150 | 51.1 | 18.1 | 90 | 10/90 |

*"sd" stands for standard deviation and "(1)/(2)" means Pigment dispersion (1)/Pigment dispersion (2).

TABLE A2-1

| | Pigment dispersion (1) | | | | | | | | Pigment dispersion (2) | | | | | Amount (%) of 2,3,4-mer in dispersing agent | (1)/(2)* (CB ratio) |
|---|---|---|---|---|---|---|---|---|---|---|---|---|---|---|---|
| Dispersion | Pre-oxidized CB | Oxidized with: | CB volatile content after oxidation | Specific surface area (m²/g) | CB pH | pH | pH adjuster | Urethane acid value | Dispersion | CB | Avg. particle diameter D50 (nm) | sd* | | | |
| Comp. Ex. A1 | 1-30 | NIPEX170 | Ozone | 10% | 200 | 3.0 | 7 | NaOH | — | 2-1 | NIPEX150 | 50.4 | 18.3 | 20 | 10/90 |
| Comp. Ex. A2 | 1-31 | NIPEX170 | Ozone | 13% | 200 | 2.5 | 7 | NaOH | — | 2-1 | NIPEX150 | 50.4 | 18.3 | 20 | 10/90 |
| Comp. Ex. A3 | 1-32 | NIPEX170 | Ozone | 20% | 200 | 2.1 | 7 | NaOH | — | 2-1 | NIPEX150 | 50.4 | 18.3 | 20 | 10/90 |
| Comp. Ex. A4 | 1-33 | PRINTEX35 | Ozone | 10% | 65 | 3.0 | 7 | NaOH | — | 2-1 | NIPEX150 | 50.4 | 18.3 | 20 | 10/90 |
| Comp. Ex. A5 | 1-34 | PRINTEX35 | Ozone | 13% | 65 | 2.5 | 7 | NaOH | — | 2-1 | NIPEX150 | 50.4 | 18.3 | 20 | 10/90 |
| Comp. Ex. A6 | 1-35 | PRINTEX35 | Ozone | 20% | 65 | 2.1 | 7 | NaOH | — | 2-1 | NIPEX150 | 50.4 | 18.3 | 20 | 10/90 |
| Comp. Ex. A7 | 1-36 | PRINTEX140 | Ozone | 7% | 90 | 3.0 | 7 | NaOH | — | 2-1 | NIPEX150 | 50.4 | 18.3 | 20 | 10/90 |
| Comp. Ex. A8 | 1-37 | PRINTEX140 | Ozone | 28% | 90 | 2.5 | 7 | NaOH | — | 2-1 | NIPEX150 | 50.4 | 18.3 | 20 | 10/90 |
| Comp. Ex. A9 | 1-38 | NIPEX160 | Ozone | 7% | 90 | 3.0 | 7 | NaOH | — | 2-1 | NIPEX150 | 50.4 | 18.3 | 20 | 10/90 |
| Comp. Ex. A10 | 1-39 | NIPEX160 | Ozone | 28% | 90 | 2.5 | 7 | NaOH | — | 2-1 | NIPEX150 | 50.4 | 18.3 | 20 | 10/90 |
| Comp. Ex. A11 | 1-40 | PRINTEXU | Na hypochlorite | 13% | 110 | 2.5 | 7 | NaOH | — | 2-1 | NIPEX150 | 50.4 | 18.3 | 20 | 10/90 |
| Comp. Ex. A12 | 1-41 | PRINTEXU | Na peroxodisulfate | 13% | 110 | 2.6 | 7 | NaOH | — | 2-1 | NIPEX150 | 50.4 | 18.3 | 20 | 10/90 |
| Comp. Ex. A13 | 1-42 | PRINTEXU | Ozone | 20% | 110 | 2.2 | 5 | NaOH | — | 2-1 | NIPEX150 | 50.4 | 18.3 | 20 | 10/90 |
| Comp. Ex. A14 | 1-43 | PRINTEXU | Ozone | 20% | 110 | 2.2 | 9 | NaOH | — | 2-1 | NIPEX150 | 50.4 | 18.3 | 20 | 10/90 |
| Comp. Ex. A15 | 1-1 | PRINTEXU | Ozone | 10% | 110 | 3.0 | 7 | NaOH | — | — | — | — | — | — | — |
| Comp. Ex. A16 | 1-2 | PRINTEXU | Ozone | 13% | 110 | 2.6 | 7 | NaOH | — | — | — | — | — | — | — |
| Comp. Ex. A17 | 1-3 | PRINTEXU | Ozone | 20% | 110 | 2.2 | 7 | NaOH | — | — | — | — | — | — | — |
| Comp. Ex. A18 | 1-12 | PRINTEXU | Ozone | 10% | 110 | 3.0 | 7 | NaOH | 80 | — | — | — | — | — | — |

TABLE A2-1-continued

| | | | | Pigment dispersion (1) | | | | | | Pigment dispersion (2) | | | | | |
|---|---|---|---|---|---|---|---|---|---|---|---|---|---|---|---|
| | | | | | | | | | | | | | | Amount | |
| | | | | CB volatile | Specific | | | | Ure- | | Avg. particle | | | (%) of 2,3,4-mer | (1)/ |
| | Dis- per- sion | Pre- oxidized CB | Oxi- dized with: | content after oxidation | surface area (m²/g) | CB pH | pH adjuster | | thane acid value | Dis- per- sion CB | diameter D50 (nm) | sd* | in dispersing agent | (2)* (CB ratio) |
| Comp. Ex. A19 | 1-13 | PRINTEXU | Ozone | 13% | 110 | 2.6 | 7 | NaOH | 80 | — — | — | — | — | — |
| Comp. Ex. A20 | 1-14 | PRINTEXU | Ozone | 20% | 110 | 2.2 | 7 | NaOH | 80 | — — | — | — | — | — |

*"sd" stands for standard deviation and "(1)/(2)" means Pigment dispersion (1)/Pigment dispersion (2).

TABLE A3

| | | Pigment dispersion (2) | | | |
|---|---|---|---|---|---|
| | Dispersion CB | Avg. particle diameter D50 (nm) | Standard deviation (sd) | Amount (%) of 2,3,4-mer in dispersing agent | Urethane acid value |
| Comp. Ex. A21 | 2-1 NIPEX150 | 50.4 | 18.3 | 20 | — |
| Comp. Ex. A22 | 2-2 NIPEX150 | 101.3 | 32.6 | 50 | — |
| Comp. Ex. A23 | 2-3 NIPEX150 | 179.6 | 65.4 | 80 | — |
| Comp. Ex. A24 | 2-7 NIPEX150 | 50.4 | 18.3 | 20 | 80 |
| Comp. Ex. A25 | 2-8 NIPEX150 | 101.3 | 32.6 | 50 | 80 |
| Comp. Ex. A26 | 2-9 NIPEX150 | 179.6 | 65.4 | 80 | 80 |

TABLE A4

| | | Pigment dispersion (1) | | | | | | | Pigment dispersion (2) | | | | | |
|---|---|---|---|---|---|---|---|---|---|---|---|---|---|---|
| | | | | | | | | | | | | | Amount (%) of | |
| | Dis- per- sion | Pre- oxidized CB | Oxi- dized with: | CB volatile content after oxidation | Specific surface area (m²/g) | CB pH | pH adjuster | Ure- thane acid value | Dis- per- sion | CB | Avg. particle diameter D50 (nm) | sd* | 2,3,4-mer in dispersing agent | (1)/(2)* (CB ratio) |
| Comp. Ex. A27 | 1-30 | PRINTEXU | Ozone | 9% | 110 | 3.0 | 7 NaOH | — | 2-1 | NIPEX150 | 50.4 | 18.3 | 20 | 10/90 |
| Comp. Ex. A28 | 1-31 | PRINTEXU | Ozone | 21% | 110 | 3.0 | 7 NaOH | — | 2-1 | NIPEX150 | 50.4 | 18.3 | 20 | 10/90 |
| Comp. Ex. A29 | 1-32 | PRINTEXU | Ozone | 9% | 80 | 3.0 | 7 NaOH | — | 2-1 | NIPEX150 | 50.4 | 18.3 | 20 | 10/90 |
| Comp. Ex. A30 | 1-33 | PRINTEXU | Ozone | 9% | 160 | 3.0 | 7 NaOH | — | 2-1 | NIPEX150 | 50.4 | 18.3 | 20 | 10/90 |
| Comp. Ex. A31 | 1-34 | PRINTEXU | Ozone | 9% | 110 | 3.0 | 5 NaOH | — | 2-1 | NIPEX150 | 50.4 | 18.3 | 20 | 10/90 |
| Comp. Ex. A32 | 1-35 | PRINTEXU | Ozone | 9% | 110 | 3.0 | 9 NaOH | — | 2-1 | NIPEX150 | 50.4 | 18.3 | 20 | 10/90 |
| Comp. Ex. A33 | 1-1 | PRINTEXU | Ozone | 10% | 110 | 3.0 | 7 NaOH | — | 2-10 | NIPEX150 | 198.3 | 76.8 | 20 | 10/90 |
| Comp. Ex. A34 | 1-1 | PRINTEXU | Ozone | 10% | 110 | 3.0 | 7 NaOH | — | 2-11 | NIPEX150 | 38.6 | 12.5 | 20 | 10/90 |
| Comp. Ex. A35 | 1-1 | PRINTEXU | Ozone | 10% | 110 | 3.0 | 7 NaOH | — | 2-12 | NIPEX150 | 177.3 | 95.4 | 20 | 10/90 |

*"sd" stands for standard deviation and "(1)/(2)" means Pigment dispersion (1)/Pigment dispersion (2)

Each of the inks of Examples and Comparative Examples was evaluated for storage stability in the following manner. In addition, each ink was charged into a cartridge, and the cartridge was mounted in an inkjet printer illustrated in FIG. 1 and subjected to a printing test in the following manner, to thereby evaluate the ink for image density. The results are shown in Tables A5 to A8.

A sample image was printed on a PPC paper sheet 4024 (unsmooth paper sheet) (product of Fuji Xerox Co., Ltd.) and a glossy paper sheet (product of EPSON Co., Ltd., MC glossy paper sheet) using the inkjet printer illustrated in FIG. 1. The solid image of the sample image was measured for image density with an XRITE938 densitometer, and the image density was evaluated according to the following criteria.

[PPC paper sheet 4024, product of Fuji Xerox Co., Ltd.]
A: 1.31≤Image density
B: 1.21≤Image density≤1.30
C: 1.11≤Image density≤1.20
D: Image density≤1.10

[MC glossy paper sheet, product of EPSON Co., Ltd.]
A: 1.81≤Image density
B: 1.71≤Image density≤1.80
C: 1.61≤Image density≤1.70
D: Image density≤1.60

(2) Ink Strageability

Each ink was measured for initial viscosity before storage. Then, 50 g of the ink was placed in a sample bottle SV-50 (product of NICHIDENRIKA-GLASS CO., LTD.). The sample bottle was hermetically sealed and stored for 2 weeks under an environment of 70° C. A rate of change in viscosity was calculated using the following equation and ranked.

The viscosity of the ink stored for 2 weeks at 70° C. was an average of three measurements which were obtained by measuring the ink three times for viscosity under an environment of 22° C. and 65% humidity.

Viscometer: RE500, product of TOYO SEIKI CO., LTD.

Rate of change (%)=[(viscosity after 2 weeks at 70° C.−initial viscosity)/initial viscosity]×100

A: Rate of change<5% (most preferable)
B: 5%≤Rate of change<10% (preferable level)
C: 10%≤Rate of change<15% (practically non-problematic level)
D: 15%≤Rate of change<20% (problematic level)
E: 20%≤Rate of change (problematic level)

(3) Ejection Stability

Ejection stability of each ink was evaluated as follows. Specifically, the printer was caused to perform printing operation and then left to stand for 1 month under an environment of 50° C. with the printer heads being capped. Whether or not the ejection state of the thus-treated printer was recovered to the initial state was evaluated as follows based on the number of cleaning operations required.

A: The printer could perform printing operation without cleaning.
B: With one cleaning operation, the ejection state of the printer was recovered to the initial state.
C: With two cleaning operations, the ejection state of the printer was recovered to the initial state.
D: With three cleaning operations, the ejection state of the printer was recovered to the initial state.
E: The ejection state of the printer was not recovered to the initial state even with more than three cleaning operations.

TABLE A5

| | Evaluation results | | | |
|---|---|---|---|---|
| | Image density on plain paper sheet | Image density on glossy paper sheet | Ink strageability | Ejection stability |
| Ex. A1 | A | A | B | B |
| Ex. A2 | A | A | B | B |
| Ex. A3 | A | A | C | C |
| Ex. A4 | A | A | B | B |
| Ex. A5 | A | A | B | B |
| Ex. A6 | A | A | C | C |
| Ex. A7 | A | A | B | B |
| Ex. A8 | A | A | B | B |
| Ex. A9 | A | A | C | C |
| Ex. A10 | A | A | B | B |
| Ex. A11 | A | A | C | C |
| Ex. A12 | A | A | A | A |
| Ex. A13 | A | A | A | A |
| Ex. A14 | A | A | A | A |
| Ex. A15 | A | A | A | A |
| Ex. A16 | A | A | A | A |
| Ex. A17 | A | A | A | A |
| Ex. A18 | A | A | A | A |
| Ex. A19 | A | A | A | A |
| Ex. A20 | A | A | A | A |
| Ex. A21 | A | A | A | A |
| Ex. A22 | A | A | A | A |
| Ex. A23 | A | A | A | A |
| Ex. A24 | A | A | A | A |
| Ex. A25 | A | A | B | B |
| Ex. A26 | A | A | B | B |
| Ex. A27 | A | A | A | A |
| Ex. A28 | A | A | B | B |
| Ex. A29 | A | A | B | B |

TABLE A6

| | Evaluation results | | | |
|---|---|---|---|---|
| | Image density on plain paper sheet | Image density on glossy paper sheet | Ink strageability | Ejection stability |
| Comp. Ex. A1 | C | C | E | E |
| Comp. Ex. A2 | C | C | E | E |
| Comp. Ex. A3 | C | C | E | E |
| Comp. Ex. A4 | D | D | E | E |
| Comp. Ex. A5 | D | D | E | E |
| Comp. Ex. A6 | D | D | E | E |
| Comp. Ex. A7 | D | D | E | E |
| Comp. Ex. A8 | D | D | E | E |
| Comp. Ex. A9 | D | D | E | E |
| Comp. Ex. A10 | C | C | E | E |
| Comp. Ex. A11 | C | C | E | E |
| Comp. Ex. A12 | C | C | E | E |
| Comp. Ex. A13 | D | D | E | E |
| Comp. Ex. A14 | C | C | E | E |
| Comp. Ex. A15 | B | C | D | D |
| Comp. Ex. A16 | B | C | D | D |
| Comp. Ex. A17 | B | C | D | D |
| Comp. Ex. A18 | B | C | C | C |
| Comp. Ex. A19 | B | C | C | C |
| Comp. Ex. A20 | B | C | C | C |

TABLE A7

| | Evaluation results | | | |
|---|---|---|---|---|
| | Image density on plain paper sheet | Image density on glossy paper sheet | Ink strageability | Ejection stability |
| Comp. Ex. A21 | C | B | D | D |
| Comp. Ex. A22 | C | B | D | D |
| Comp. Ex. A23 | C | B | D | D |

TABLE A7-continued

| | Evaluation results | | | |
|---|---|---|---|---|
| | Image density on plain paper sheet | Image density on glossy paper sheet | Ink strageability | Ejection stability |
| Comp. Ex. A24 | C | B | C | C |
| Comp. Ex. A25 | C | B | C | C |
| Comp. Ex. A26 | C | B | C | C |

TABLE A8

| | Evaluation results | | | |
|---|---|---|---|---|
| | Image density on plain paper sheet | Image density on glossy paper sheet | Ink strageability | Ejection stability |
| Comp. Ex. A27 | B | B | D | D |
| Comp. Ex. A28 | B | B | D | D |
| Comp. Ex. A29 | B | B | D | B |
| Comp. Ex. A30 | B | B | D | B |
| Comp. Ex. A31 | B | B | D | B |
| Comp. Ex. A32 | B | B | D | B |
| Comp. Ex. A33 | B | B | D | B |
| Comp. Ex. A34 | B | B | D | B |
| Comp. Ex. A35 | B | B | D | B |

It is clear that the inkjet recording ink of the present invention provides high image density on the unsmooth paper sheet (plain paper sheet) and the smooth paper sheet (glossy paper sheet) from the comparison among Examples A1 to A11, Comparative Examples A1 to A17, Comparative Examples A21 to A23 and Comparative Examples A27 to A35. From Examples A12 to A27, it was also found that incorporation of the polyether-type polyurethane having an acid value of 40 mgKOH/g to 100 mgKOH/g improves the ink storageability and the ejection stability.

As is clear from Examples A12 to A24 and Examples A28 and A29, the ink storageability and the ejection stability are improved when the total amount of dimer, trimer and tetramer of naphthalenesulfonic acid is 20% to 80% in the naphthalenesulfonic acid-formalin condensate which is the dispersing agent of the pigment dispersion (2).

Next, description will be given to Examples using the inkjet recording ink according to the second embodiment.

Example B1

Carbon black PRINTEX-U (product of Degussa Co., Ltd.) (200 g) was placed in a hollow-cylindrical ozone treating device, and ozone was generated at 6 g/h using an ozone generator KQS-120 (product of KOTOHIRA KOGYO CO., LTD.). The carbon black was oxidized with ozone at 30° C. for 5 hours to thereby obtain an oxidized carbon black. Through measurements, the obtained oxidized carbon black was found to have a volatile content of 10% and a BET specific surface area of 110 m²/g.

The oxidized carbon black (25 parts) and distilled water (70 parts) were pre-mixed together, and 5 parts of distilled water was further added to the mixture. Next, the oxidized carbon black was dispersed in water for 7 min with a disc-type bead mill of KDL-model batch type (product of Shinmaru Enterprises Corporation) containing zirconia beads 0.2 mm in diameter at a circumference speed of 8 m/s and a liquid temperature of 10° C. Furthermore, coarse particles were separated therefrom using a centrifugal separator Model-3600 (product of KUBOTA Corporation) to thereby obtain an oxidized carbon black dispersion containing the oxidized carbon black dispersed therein. The oxidized carbon black dispersed was found to have a volume average particle diameter of 115 nm and a standard deviation of 45.3 nm.

The volume average particle diameter of the oxidized carbon black dispersed was measured at 22° C. using MICROTRAC UPA150 (product of NIKKISO CO., LTD.).

The oxidized carbon black dispersion (32 parts), 3-methoxy-N,N-dimethylpropionamide (25 parts), 1,3-butanediol (15 parts), glycerin (10 parts), 2-ethyl-1,3-hexanediol (2 parts), a fluorosurfactant ZONYL FS-300 (solid content: 40%) (product of DuPont Co., Ltd.) (2.5 parts), an emulsion of a fluoroethylene-vinyl ether block copolymer (solid content: 50%) (product of ASAHI GLASS CO., LTD., LUMIFLON FE4300, average particle diameter: 150 nm, MFT: ≤30° C.) (6.0 parts) and distilled water (7.5 parts) were mixed together under stirring for 30 min. Next, the resultant mixture was adjusted in pH to 10 with a 40% aqueous solution of 2-amino-2-ethyl-1,3-propanediol, followed by mixing and stirring for 30 min, to thereby prepare an inkjet recording ink. The carbon black in the obtained inkjet recording ink was found to have a volume average particle diameter of 115.5 nm.

The average particle diameter of the carbon black in the inkjet recording ink was measured using a transmission electron microscope H-7000 (product of Hitachi, Ltd.).

Example B2

An inkjet recording ink was obtained in the same manner as in Example B1 except that the amount of 3-methoxy-N,N-dimethylpropionamide, the amount of 1,3-butanediol and the amount of glycerin were changed to 5 parts, 25 parts and 20 parts, respectively. The carbon black in the obtained inkjet recording ink was found to have a volume average particle diameter of 115.3 nm.

Example B3

An inkjet recording ink was obtained in the same manner as in Example B1 except that the amount of 3-methoxy-N,N-dimethylpropionamide, the amount of 1,3-butanediol and the amount of glycerin were changed to 45 parts, 0 parts and 5 parts, respectively. The carbon black in the obtained inkjet recording ink was found to have a volume average particle diameter of 115.5 nm.

Example B4

An inkjet recording ink was obtained in the same manner as in Example B1 except that the amount of 3-methoxy-N,N-dimethylpropionamide, the amount of 1,3-butanediol and the amount of glycerin were changed to 50 parts, 0 parts and 0 parts, respectively. The carbon black in the obtained inkjet recording ink was found to have a volume average particle diameter of 115.2 nm.

Example B5

Carbon black PRINTEX-U (product of Degussa Co., Ltd.) (200 g) was placed in a hollow-cylindrical ozone treating device, and ozone was generated at 6 g/h using an ozone generator KQS-120 (product of KOTOHIRA KOGYO CO., LTD.). The carbon black was oxidized with ozone at 30° C. for 10 hours to thereby obtain an oxidized carbon black. Through measurements, the obtained oxidized carbon black was found to have a volatile content of 20% and a BET specific surface area of 110 m²/g.

An inkjet recording ink was obtained in the same manner as in Example B1 except that the obtained oxidized carbon black was used. The carbon black in the obtained inkjet recording ink was found to have a volume average particle diameter of 107 nm. Also, the oxidized carbon black dispersed in the oxidized carbon black dispersion was found to have a volume average particles diameter of 116 nm and a standard deviation of 46.2 nm.

Example B6

An inkjet recording ink was obtained in the same manner as in Example B5 except that the amount of 3-methoxy-N,N-dimethylpropionamide, the amount of 1,3-butanediol and the amount of glycerin were changed to 5 parts, 25 parts and 20 parts, respectively. The carbon black in the obtained inkjet recording ink was found to have a volume average particle diameter of 116.4 nm.

Example B7

An inkjet recording ink was obtained in the same manner as in Example B5 except that the amount of 3-methoxy-N,N-dimethylpropionamide, the amount of 1,3-butanediol and the amount of glycerin were changed to 45 parts, 0 parts and 5 parts, respectively. The carbon black in the obtained inkjet recording ink was found to have a volume average particle diameter of 116.2 nm.

Example B8

An inkjet recording ink was obtained in the same manner as in Example B5 except that the amount of 3-methoxy-N,N-dimethylpropionamide, the amount of 1,3-butanediol and the amount of glycerin were changed to 50 parts, 0 parts and 0 parts, respectively. The carbon black in the obtained inkjet recording ink was found to have a volume average particle diameter of 116.7 nm.

Example B9

Carbon black NIPEX160 (product of Degussa Co., Ltd.) (200 g) was placed in a hollow-cylindrical ozone treating device, and ozone was generated at 6 g/h using an ozone generator KQS-120 (product of KOTOHIRA KOGYO CO., LTD.). The carbon black was oxidized with ozone at 30° C. for 5 hours to thereby obtain an oxidized carbon black. Through measurements, the obtained oxidized carbon black was found to have a volatile content of 10% and a BET specific surface area of 150 m²/g.

An inkjet recording ink was obtained in the same manner as in Example B1 except that the obtained oxidized carbon black was used. The carbon black in the obtained inkjet recording ink was found to have a volume average particle diameter of 121.8 nm. Also, the oxidized carbon black dispersed in the oxidized carbon black dispersion was found to have a volume average particles diameter of 121.3 nm and a standard deviation of 52.1 nm.

Example B10

An inkjet recording ink was obtained in the same manner as in Example B9 except that the amount of 3-methoxy-N,N-dimethylpropionamide, the amount of 1,3-butanediol and the amount of glycerin were changed to 5 parts, 25 parts and 20 parts, respectively. The carbon black in the obtained inkjet recording ink was found to have a volume average particle diameter of 121.7 nm.

Example B11

An inkjet recording ink was obtained in the same manner as in Example B9 except that the amount of 3-methoxy-N,N-dimethylpropionamide, the amount of 1,3-butanediol and the amount of glycerin were changed to 45 parts, 0 parts and 5 parts, respectively. The carbon black in the obtained inkjet recording ink was found to have a volume average particle diameter of 120.3 nm.

Example B12

An inkjet recording ink was obtained in the same manner as in Example B9 except that the amount of 3-methoxy-N,N-dimethylpropionamide, the amount of 1,3-butanediol and the amount of glycerin were changed to 50 parts, 0 parts and 0 parts, respectively. The carbon black in the obtained inkjet recording ink was found to have a volume average particle diameter of 121.8 nm.

Example B13

Carbon black NIPEX160 (product of Degussa Co., Ltd.) (200 g) was placed in a hollow-cylindrical ozone treating device, and ozone was generated at 6 g/h using an ozone generator KQS-120 (product of KOTOHIRA KOGYO CO., LTD.). The carbon black was oxidized with ozone at 30° C. for 10 hours to thereby obtain an oxidized carbon black. Through measurements, the obtained oxidized carbon black was found to have a volatile content of 20% and a BET specific surface area of 150 m²/g.

An inkjet recording ink was obtained in the same manner as in Example B1 except that the obtained oxidized carbon black was used. The carbon black in the obtained inkjet recording ink was found to have a volume average particle diameter of 122.2 nm. Also, the oxidized carbon black dispersed in the oxidized carbon black dispersion was found to have a volume average particles diameter of 122.1 nm and a standard deviation of 53.6 nm.

Example B14

An inkjet recording ink was obtained in the same manner as in Example B13 except that the amount of 3-methoxy-N,N-dimethylpropionamide, the amount of 1,3-butanediol and the amount of glycerin were changed to 5 parts, 25 parts and 20 parts, respectively. The carbon black in the obtained inkjet recording ink was found to have a volume average particle diameter of 122.1 nm.

Example B15

An inkjet recording ink was obtained in the same manner as in Example B13 except that the amount of 3-methoxy-N,N-dimethylpropionamide, the amount of 1,3-butanediol and the amount of glycerin were changed to 45 parts, 0 parts and 5 parts, respectively. The carbon black in the obtained inkjet recording ink was found to have a volume average particle diameter of 122.8 nm.

Example B16

An inkjet recording ink was obtained in the same manner as in Example B13 except that the amount of 3-methoxy-N,N- dimethylpropionamide, the amount of 1,3-butanediol and the amount of glycerin were changed to 50 parts, 0 parts and 0 parts, respectively. The carbon black in the obtained inkjet recording ink was found to have a volume average particle diameter of 122.4 nm.

Example B17

Carbon black PRINTEX140 (product of Degussa Co., Ltd.) (200 g) was placed in a hollow-cylindrical ozone treating device, and ozone was generated at 6 g/h using an ozone generator KQS-120 (product of KOTOHIRA KOGYO CO., LTD.). The carbon black was oxidized with ozone at 30° C. for 5 hours to thereby obtain an oxidized carbon black. Through measurements, the obtained oxidized carbon black was found to have a volatile content of 10% and a BET specific surface area of 90 m$^2$/g.

An inkjet recording ink was obtained in the same manner as in Example B1 except that the obtained oxidized carbon black was used. The carbon black in the obtained inkjet recording ink was found to have a volume average particle diameter of 119.2 nm. Also, the oxidized carbon black dispersed in the oxidized carbon black dispersion was found to have a volume average particles diameter of 118.3 nm and a standard deviation of 47.3 nm.

Example B18

An inkjet recording ink was obtained in the same manner as in Example B17 except that the amount of 3-methoxy-N,N-dimethylpropionamide, the amount of 1,3-butanediol and the amount of glycerin were changed to 5 parts, 25 parts and 20 parts, respectively. The carbon black in the obtained inkjet recording ink was found to have a volume average particle diameter of 119.3 nm.

Example B19

An inkjet recording ink was obtained in the same manner as in Example B17 except that the amount of 3-methoxy-N,N-dimethylpropionamide, the amount of 1,3-butanediol and the amount of glycerin were changed to 45 parts, 0 parts and 5 parts, respectively. The carbon black in the obtained inkjet recording ink was found to have a volume average particle diameter of 119.1 nm.

Example B20

An inkjet recording ink was obtained in the same manner as in Example B17 except that the amount of 3-methoxy-N,N-dimethylpropionamide, the amount of 1,3-butanediol and the amount of glycerin were changed to 50 parts, 0 parts and 0 parts, respectively. The carbon black in the obtained inkjet recording ink was found to have a volume average particle diameter of 119.5 nm.

Example B21

Carbon black PRINTEX140 (product of Degussa Co., Ltd.) (200 g) was placed in a hollow-cylindrical ozone treating device, and ozone was generated at 6 g/h using an ozone generator KQS-120 (product of KOTOHIRA KOGYO CO., LTD.). The carbon black was oxidized with ozone at 30° C. for 10 hours to thereby obtain an oxidized carbon black. Through measurements, the obtained oxidized carbon black was found to have a volatile content of 20% and a BET specific surface area of 90 m$^2$/g.

An inkjet recording ink was obtained in the same manner as in Example B1 except that the obtained oxidized carbon black was used. The carbon black in the obtained inkjet recording ink was found to have a volume average particle diameter of 120.3 nm. Also, the oxidized carbon black dispersed in the oxidized carbon black dispersion was found to have a volume average particles diameter of 119.5 nm and a standard deviation of 47.8 nm.

Example B22

An inkjet recording ink was obtained in the same manner as in Example B21 except that the amount of 3-methoxy-N,N-dimethylpropionamide, the amount of 1,3-butanediol and the amount of glycerin were changed to 5 parts, 25 parts and 20 parts, respectively. The carbon black in the obtained inkjet recording ink was found to have a volume average particle diameter of 121.2 nm Example B23

An inkjet recording ink was obtained in the same manner as in Example B21 except that the amount of 3-methoxy-N,N-dimethylpropionamide, the amount of 1,3-butanediol and the amount of glycerin were changed to 45 parts, 0 parts and 5 parts, respectively. The carbon black in the obtained inkjet recording ink was found to have a volume average particle diameter of 120.4 nm Example B24

An inkjet recording ink was obtained in the same manner as in Example B21 except that the amount of 3-methoxy-N,N-dimethylpropionamide, the amount of 1,3-butanediol and the amount of glycerin were changed to 50 parts, 0 parts and 0 parts, respectively. The carbon black in the obtained inkjet recording ink was found to have a volume average particle diameter of 120.3 nm.

Example B25

Carbon black PRINTEX-U (product of Degussa Co., Ltd.) (200 g) was placed in a hollow-cylindrical ozone treating device, and ozone was generated at 6 g/h using an ozone generator KQS-120 (product of KOTOHIRA KOGYO CO., LTD.). The carbon black was oxidized with ozone at 30° C. for 5 hours to thereby obtain an oxidized carbon black. Through measurements, the obtained oxidized carbon black was found to have a volatile content of 10% and a BET specific surface area of 110 m$^2$/g.

The oxidized carbon black (25 parts) and distilled water (70 parts) were pre-mixed together, and the mixture was neutralized with 2-amino-2-ethyl-1,3-propanediol (solid content: 20%) so as to have a pH of 7. Thereafter, distilled water was added to the mixture so that the total amount thereof was 100 parts. Next, the oxidized carbon black was dispersed in water for 5 min with a disc-type bead mill of KDL-model batch type (product of Shinmaru Enterprises Corporation) containing zirconia beads 0.2 mm in diameter at a circumference speed of 10 m/s and a liquid temperature of 10° C. Furthermore, coarse particles were separated therefrom using a centrifugal separator Model-3600 (product of KUBOTA Corporation) to thereby obtain an oxidized carbon black dispersion containing the oxidized carbon black dispersed therein. The oxidized carbon black dispersed was found to have a volume average particle diameter of 140 nm and a standard deviation of 70 nm.

An inkjet recording ink was obtained in the same manner as in Example B1 except that the obtained oxidized carbon black dispersion was used. The carbon black in the obtained inkjet recording ink was found to have a volume average particle diameter of 141.2 nm.

Example B26

An inkjet recording ink was obtained in the same manner as in Example B25 except that the 2-amino-2-ethyl-1,3-propanediol (solid content: 20%) was changed to triethanolamine (solid content: 20%). The carbon black in the obtained inkjet recording ink was found to have a volume average particle diameter of 141.6 nm. Also, the oxidized carbon black dispersed in the oxidized carbon black dispersion was found to have a volume average particles diameter of 141.3 nm and a standard deviation of 69.5 nm.

Example B27

An inkjet recording ink was obtained in the same manner as in Example B25 except that the 2-amino-2-ethyl-1,3-propanediol (solid content: 20%) was changed to a 20% aqueous sodium hydroxide solution. The carbon black in the obtained inkjet recording ink was found to have a volume average particle diameter of 142.3 nm. Also, the oxidized carbon black dispersed in the oxidized carbon black dispersion was found to have a volume average particles diameter of 142.5 nm and a standard deviation of 70.0 nm.

Example B28

An inkjet recording ink was obtained in the same manner as in Example B25 except that the 2-amino-2-ethyl-1,3-propanediol (solid content: 20%) was changed to a 10% aqueous lithium hydroxide solution. The carbon black in the obtained inkjet recording ink was found to have a volume average particle diameter of 141.8 nm. Also, the oxidized carbon black dispersed in the oxidized carbon black dispersion was found to have a volume average particles diameter of 141.4 nm and a standard deviation of 69.4 nm.

Example B29

An inkjet recording ink was obtained in the same manner as in Example B25 except that the 2-amino-2-ethyl-1,3-propanediol (solid content: 20%) was changed to a 10% aqueous potassium hydroxide solution. The carbon black in the obtained inkjet recording ink was found to have a volume average particle diameter of 141.3 nm. Also, the oxidized carbon black dispersed in the oxidized carbon black dispersion was found to have a volume average particles diameter of 141.7 nm and a standard deviation of 70.2 nm.

Comparative Example B1

An inkjet recording ink was obtained in the same manner as in Example B1 except that the amount of 3-methoxy-N,N-dimethylpropionamide, the amount of 1,3-butanediol and the amount of glycerin were changed to 0 parts, 20 parts and 30 parts, respectively. The carbon black in the obtained inkjet recording ink was found to have a volume average particle diameter of 115.6 nm.

Comparative Example B2

Carbon black PRINTEX-U (product of Degussa Co., Ltd.) (200 g) was placed in a hollow-cylindrical ozone treating device, and ozone was generated at 6 g/h using an ozone generator KQS-120 (product of KOTOHIRA KOGYO CO., LTD.). The carbon black was oxidized with ozone at 30° C. for 3.5 hours to thereby obtain an oxidized carbon black. Through measurements, the obtained oxidized carbon black was found to have a volatile content of 9% and a BET specific surface area of 110 $m^2/g$.

An inkjet recording ink was obtained in the same manner as in Example B4 except that the obtained oxidized carbon black was used. The carbon black in the obtained inkjet recording ink was found to have a volume average particle diameter of 115.3 nm. Also, the oxidized carbon black dispersed in the oxidized carbon black dispersion was found to have a volume average particles diameter of 114.8 nm and a standard deviation of 46.2 nm.

Comparative Example B3

Carbon black PRINTEX-U (product of Degussa Co., Ltd.) (200 g) was placed in a hollow-cylindrical ozone treating device, and ozone was generated at 6 g/h using an ozone generator KQS-120 (product of KOTOHIRA KOGYO CO., LTD.). The carbon black was oxidized with ozone at 30° C. for 12 hours to thereby obtain an oxidized carbon black. Through measurements, the obtained oxidized carbon black was found to have a volatile content of 21% and a BET specific surface area of 110 $m^2/g$.

An inkjet recording ink was obtained in the same manner as in Example B4 except that the obtained oxidized carbon black was used. The carbon black in the obtained inkjet recording ink was found to have a volume average particle diameter of 116.4 nm. Also, the oxidized carbon black dispersed in the oxidized carbon black dispersion was found to have a volume average particles diameter of 116.7 nm and a standard deviation of 47.9 nm.

Comparative Example B4

Carbon black PRINTEX-35 (product of Degussa Co., Ltd.) (200 g) was placed in a hollow-cylindrical ozone treating device, and ozone was generated at 6 g/h using an ozone generator KQS-120 (product of KOTOHIRA KOGYO CO., LTD.). The carbon black was oxidized with ozone at 30° C. for 6.5 hours to thereby obtain an oxidized carbon black. Through measurements, the obtained oxidized carbon black was found to have a volatile content of 13% and a BET specific surface area of 65 $m^2/g$.

An inkjet recording ink was obtained in the same manner as in Example B4 except that the obtained oxidized carbon black was used. The carbon black in the obtained inkjet recording ink was found to have a volume average particle diameter of 116.3 nm. Also, the oxidized carbon black dispersed in the oxidized carbon black dispersion was found to have a volume average particles diameter of 115.8 nm and a standard deviation of 47.3 nm.

Comparative Example B5

Carbon black PRINTEX-85 (product of Degussa Co., Ltd.) (200 g) was placed in a hollow-cylindrical ozone treating device, and ozone was generated at 6 g/h using an ozone generator KQS-120 (product of KOTOHIRA KOGYO CO., LTD.). The carbon black was oxidized with ozone at 30° C. for 6.5 hours to thereby obtain an oxidized carbon black. Through measurements, the obtained oxidized carbon black was found to have a volatile content of 13% and a BET specific surface area of 200 $m^2/g$.

An inkjet recording ink was obtained in the same manner as in Example B4 except that the obtained oxidized carbon black was used. The carbon black in the obtained inkjet recording ink was found to have a volume average particle diameter of 117.8 nm. Also, the oxidized carbon black dispersed in the oxidized carbon black dispersion was found to have a volume average particles diameter of 117.2 nm and a standard deviation of 48.1 nm.

Comparative Example B6

Carbon black PRINTEX-U (product of Degussa Co., Ltd.) (100 g) was mixed under stirring with 500 g of distilled water. Then, 1,000 g of 12% by mass sodium hypochlorite liquid was added dropwise to the resultant mixture, which was then boiled for 6 hours to perform wet oxidation. The thus-treated mixture was filtrated with a glass fiber filter, washed with distilled water and dried in a high-temperature bath of 100° C., to thereby obtain an oxidized carbon black. Through measurements, the obtained oxidized carbon black was found to have a volatile content of 13% and a BET specific surface area of 110 $m^2/g$.

An inkjet recording ink was obtained in the same manner as in Example B4 except that the obtained oxidized carbon black was used. The carbon black in the obtained inkjet recording ink was found to have a volume average particle diameter of 118.2 nm. Also, the oxidized carbon black dispersed in the oxidized carbon black dispersion was found to have a volume average particles diameter of 117.2 nm and a standard deviation of 47.9 nm.

Comparative Example B7

Carbon black PRINTEX-U (product of Degussa Co., Ltd.) (100 g) was mixed under stirring with 500 g of distilled water. Then, 600 g of 10% by mass sodium peroxodisulfate liquid was added dropwise to the resultant mixture, which was then boiled for 6 hours to perform wet oxidation. The thus-treated mixture was filtrated with a glass fiber filter, washed with distilled water and dried in a high-temperature bath of 100° C., to thereby obtain an oxidized carbon black. Through measurements, the obtained oxidized carbon black was found to have a volatile content of 13% and a BET specific surface area of 110 $m^2/g$.

An inkjet recording ink was obtained in the same manner as in Example B4 except that the obtained oxidized carbon black was used. The carbon black in the obtained inkjet recording ink was found to have a volume average particle diameter of 117.3 nm. Also, the oxidized carbon black dispersed in the oxidized carbon black dispersion was found to have a volume average particles diameter of 116.2 nm and a standard deviation of 48.3 nm.

The properties of the inkjet recording inks of Examples and Comparative Examples are shown in Tables B1-1, B1-2 and B2.

TABLE B1-1

| | Oxidized carbon black | | | | Amount of wetting agent added (parts) | | |
|---|---|---|---|---|---|---|---|
| | Oxidizing agent | Volatile content (%) | BET specific surface area ($m^2/g$) | Base used for neutralization | $CH_3OCH_2CH_2CON(CH_3)_2$ | $CH_3CH(OH)CH_2CH_2OH$ | $HOCH_2CH(OH)CH_2OH$ |
| Ex. B1 | $O_3$ | 10 | 110 | — | 25 | 15 | 10 |
| Ex. B2 | $O_3$ | 10 | 110 | — | 5 | 25 | 20 |
| Ex. B3 | $O_3$ | 10 | 110 | — | 45 | — | 5 |
| Ex. B4 | $O_3$ | 10 | 110 | — | 50 | — | — |
| Ex. B5 | $O_3$ | 20 | 110 | — | 25 | 15 | 10 |
| Ex. B6 | $O_3$ | 20 | 110 | — | 5 | 25 | 20 |
| Ex. B7 | $O_3$ | 20 | 110 | — | 45 | — | 5 |
| Ex. B8 | $O_3$ | 20 | 110 | — | 50 | — | — |
| Ex. B9 | $O_3$ | 10 | 150 | — | 25 | 15 | 10 |
| Ex. B10 | $O_3$ | 10 | 150 | — | 5 | 25 | 20 |
| Ex. B11 | $O_3$ | 10 | 150 | — | 45 | — | 5 |
| Ex. B12 | $O_3$ | 10 | 150 | — | 50 | — | — |
| Ex. B13 | $O_3$ | 20 | 150 | — | 25 | 15 | 10 |
| Ex. B14 | $O_3$ | 20 | 150 | — | 5 | 25 | 20 |
| Ex. B15 | $O_3$ | 20 | 150 | — | 45 | — | 5 |

TABLE B1-2

| | Oxidized carbon black | | | | Amount of wetting agent added (parts) | | |
|---|---|---|---|---|---|---|---|
| | Oxidizing agent | Volatile content (%) | BET specific surface area ($m^2/g$) | Base used for neutralization | $CH_3OCH_2CH_2CON(CH_3)_2$ | $CH_3CH(OH)CH_2CH_2OH$ | $HOCH_2CH(OH)CH_2OH$ |
| Ex. B16 | $O_3$ | 20 | 150 | — | 50 | — | — |
| Ex. B17 | $O_3$ | 10 | 90 | — | 25 | 15 | 10 |
| Ex. B18 | $O_3$ | 10 | 90 | — | 5 | 25 | 20 |
| Ex. B19 | $O_3$ | 10 | 90 | — | 45 | — | 5 |
| Ex. B20 | $O_3$ | 10 | 90 | — | 50 | — | — |
| Ex. B21 | $O_3$ | 20 | 90 | — | 25 | 15 | 10 |
| Ex. B22 | $O_3$ | 20 | 90 | — | 5 | 25 | 20 |

TABLE B1-2-continued

| | Oxidized carbon black | | | | Amount of wetting agent added (parts) | | |
|---|---|---|---|---|---|---|---|
| | Oxidizing agent | Volatile content (%) | BET specific surface area (m²/g) | Base used for neutralization | $CH_3OCH_2CH_2CON(CH_3)_2$ | $CH_3CH(OH)CH_2CH_2OH$ | $HOCH_2CH(OH)CH_2OH$ |
| Ex. B23 | $O_3$ | 20 | 90 | — | 45 | — | 5 |
| Ex. B24 | $O_3$ | 20 | 90 | — | 50 | — | — |
| Ex. B25 | $O_3$ | 10 | 110 | $CH_3CH_2C(CH_2OH)_2NH_2$ | 25 | 15 | 10 |
| Ex. B26 | $O_3$ | 10 | 110 | $N(CH_2CH_2OH)_3$ | 25 | 15 | 10 |
| Ex. B27 | $O_3$ | 10 | 110 | NaOH | 25 | 15 | 10 |
| Ex. B28 | $O_3$ | 10 | 110 | LiOH | 25 | 15 | 10 |
| Ex. B29 | $O_3$ | 10 | 110 | KOH | 25 | 15 | 10 |

TABLE B2

| | Oxidized carbon black | | | | Amount of wetting agent added (parts) | | |
|---|---|---|---|---|---|---|---|
| | Oxidizing agent | Volatile content (%) | BET specific surface area (m²/g) | Base used for neutralization | $CH_3OCH_2CH_2CON(CH_3)_2$ | $CH_3CH(OH)CH_2CH_2OH$ | $HOCH_2CH(OH)CH_2OH$ |
| Comp. Ex. B1 | $O_3$ | 10 | 110 | — | — | 20 | 30 |
| Comp. Ex. B2 | $O_3$ | 9 | 110 | — | 50 | — | — |
| Comp. Ex. B3 | $O_3$ | 21 | 110 | — | 50 | — | — |
| Comp. Ex. B4 | $O_3$ | 13 | 65 | — | 50 | — | — |
| Comp. Ex. B5 | $O_3$ | 13 | 200 | — | 50 | — | — |
| Comp. Ex. B6 | NaClO | 13 | 110 | — | 50 | — | — |
| Comp. Ex. B7 | $Na_2S_2O_8$ | 13 | 110 | — | 50 | — | — |

Next, each of the inkjet recording inks of Examples and Comparative Examples was evaluated for image density, storage stability, ejection stability, adhesion resistance and drying property.

<Image Density>

Each inkjet recording ink was charged into an ink cartridge, which was then mounted in an inkjet printer IPSIO GXE5500 (product of Ricoh Company, Ltd.). This inkjet printer was caused to print a solid image on a plain paper PPC 4024 sheet (product of Fuji Xerox Co., Ltd.) and an MC glossy paper sheet (product of EPSON Co., Ltd.,), and the solid image printed thereon was measured for image density using an XRITE938 densitometer.

The image density of the solid image on the plain paper sheet was evaluated according to the following criteria.
A: 1.30≤Image density
B: 1.20≤Image density<1.30
C, 1.10≤Image density<1.20
D: 1.00≤Image density<1.10
E: Image density<1.00

The image density of the solid image on the glossy paper sheet was evaluated according to the following criteria.
A: 1.80≤Image density
B: 1.70≤Image density<1.80
C: 1.60≤Image density<1.70
D: 1.50≤Image density<1.60
E: Image density<1.50

<Storage Stability>

Each inkjet recording ink was measured for initial viscosity before storage using viscometer RE500 (product of TOYO SEIKI CO., LTD.). Then, 50 g of the inkjet recording ink was placed in a sample bottle SV-50 (product of NICHIDEN-RIKA-GLASS CO., LTD.). The sample bottle was hermetically sealed and stored for 4 weeks under an environment of 70° C. The viscosity of the inkjet recording ink after storage was measured using viscometer RE500 (product of TOYO SEIKI CO., LTD.). A rate of change in viscosity was calculated using the following equation to evaluate the storage stability of the inkjet recording ink.

(Viscosity after storage−Viscosity before storage)/(Viscosity before storage)×100

The storage stability was evaluated according to the following criteria.
A: Rate of change<5%
B: 5%≤Rate of change<10%
C: 10%≤Rate of change<15%
D: 15%≤Rate of change<20%
E: 20%≤Rate of change <Ejection Stability>

Each inkjet recording ink was charged into an ink cartridge, which was then mounted in an inkjet printer IPSIO GXE5500 (product of Ricoh Company, Ltd.), which was then caused to form an image. Next, this inkjet printer was left to stand for 2.5 months under an environment of 50° C. with the inkjet heads being capped. The ejection stability of the inkjet recording ink was evaluated based on the number of cleaning operations required that the ejection state of the inkjet recording ink after being left to stand was recovered to the initial state of the inkjet recording ink before being left to stand.

A: The printer could perform printing operation without cleaning.
B: With one cleaning operation, the ejection state was recovered to the initial state.
C: With two cleaning operations, the ejection state was recovered to the initial state.
D: With three cleaning operations, the ejection state was recovered to the initial state.
E: With four or more cleaning operations, the ejection state was recovered to the initial state.

<Adhesion Resistance>

After varying the driving voltage of a piezo element to eject each inkjet recording ink in the same amount from an inkjet printer IPSIO GXE5500 (product of Ricoh Company, Ltd.) under an environment of 28° C.±0.5° C. and 15% RH±5% RH, the head cleaning operation was continuously performed 10 times every hour for 10 hours. The inkjet printer was left to stand for 12 hours, and the ink adhesion on the wiper and the wiper cleaner of the maintenance device were visually observed.

The adhesion resistance of the inkjet recording ink was evaluated according to the following criteria.
A: No adhesion of the inkjet recording ink was observed.
B: Adhesion of the inkjet recording ink was somewhat observed.
C: Adhesion of the inkjet recording ink was observed.

<Drying Property>

Each inkjet recording ink was charged into an ink cartridge, which was then mounted in an inkjet printer IPSIO GXE5500 (product of Ricoh Company, Ltd.). This inkjet printer was caused to print a test chart on a sheet of MYPAPER (product of Ricoh Company, Ltd.). Immediately after the printing, filter paper was pressed against the area where the character "■" had been printed. The presence of the ink transferred onto the filter paper was visually evaluated according to the following evaluation criteria.
A: There was no smear transferred.
B: There was slight smear transferred.
C: There was smear transferred.

Table B3 shows the evaluation results of the image density, storage stability, ejection stability, adhesion resistance and drying property of the inkjet recording inks of Examples and Comparative Examples.

TABLE B3

| | Image density | | Storage stability | Ejection stability | Adhesion resistance | Drying property |
|---|---|---|---|---|---|---|
| | Plain paper | Glossy paper | | | | |
| Ex. B1 | B | B | B | B | A | A |
| Ex. B2 | B | B | B | C | A | A |
| Ex. B3 | B | B | B | B | A | A |
| Ex. B4 | C | B | B | B | A | B |
| Ex. B5 | B | B | B | B | A | A |
| Ex. B6 | B | B | B | C | A | A |
| Ex. B7 | B | B | B | B | A | A |
| Ex. B8 | C | B | B | B | A | B |
| Ex. B9 | B | B | B | B | A | A |
| Ex. B10 | B | B | B | C | A | A |
| Ex. B11 | B | B | B | B | A | A |
| Ex. B12 | C | B | B | B | A | B |
| Ex. B13 | B | B | B | B | A | A |
| Ex. B14 | B | B | B | C | A | A |
| Ex. B15 | B | B | B | B | A | A |
| Ex. B16 | C | B | B | B | A | B |
| Ex. B17 | B | B | B | B | A | A |
| Ex. B18 | B | B | B | C | A | A |
| Ex. B19 | B | B | B | B | A | A |
| Ex. B20 | C | B | B | B | A | B |
| Ex. B21 | B | B | B | B | A | A |
| Ex. B22 | B | B | B | C | A | A |
| Ex. B23 | B | B | B | B | A | A |
| Ex. B24 | C | B | B | B | A | B |
| Ex. B25 | B | A | A | A | A | A |
| Ex. B26 | B | A | A | A | A | A |
| Ex. B27 | A | A | A | A | A | A |
| Ex. B28 | A | A | A | A | A | A |
| Ex. B29 | A | A | A | A | A | A |
| Comp. Ex. B1 | B | B | D | D | C | C |
| Comp. Ex. B2 | C | D | D | D | B | B |
| Comp. Ex. B3 | C | D | D | D | B | B |
| Comp. Ex. B4 | C | D | D | D | B | B |
| Comp. Ex. B5 | C | D | D | D | B | B |
| Comp. Ex. B6 | D | E | E | E | B | B |
| Comp. Ex. B7 | D | E | E | E | B | B |

As is clear from Tables B1-1, B1-2, B2 and B3, the inkjet recording inks of Examples B1 to B29 are excellent in image density on plain paper and glossy paper, storage stability, ejection stability, adhesion resistance and drying property.

In contrast, the inkjet recording ink of Comparative Example B1 contained no 3-methoxy-N,N-dimethylpropionamide and thus was degraded in storage stability, ejection stability, adhesion resistance and drying property.

In the inkjet recording ink of Comparative Example B2, the volatile content of the oxidized carbon black was 9%. Thus, the inkjet recording ink of Comparative Example B2 was degraded in image density on glossy paper, storage stability, ejection stability and adhesion resistance.

In the inkjet recording ink of Comparative Example B3, the volatile content of the oxidized carbon black was 21%. Thus, the inkjet recording ink of Comparative Example B3 was degraded in image density on glossy paper, storage stability, ejection stability and adhesion resistance.

In the inkjet recording ink of Comparative Example B4, the BET specific surface area of the oxidized carbon black was 65 m$^2$/g. Thus, the inkjet recording ink of Comparative Example B4 was degraded in image density on glossy paper, storage stability, ejection stability and adhesion resistance.

In the inkjet recording ink of Comparative Example B5, the BET specific surface area of the oxidized carbon black was 200 m$^2$/g. Thus, the inkjet recording ink of Comparative Example B5 was degraded in image density on glossy paper, storage stability, ejection stability and adhesion resistance.

In the inkjet recording inks of Comparative Examples B6 and B7, the oxidized carbon black was not oxidized with ozone. Thus, the inkjet recording inks of Comparative Examples B6 and B7 were degraded in image density on plain paper and glossy paper, storage stability, ejection stability and adhesion resistance.

Embodiments of the present invention are as follows.

<1> An inkjet recording ink including:
water;
a first pigment dispersion;
a second pigment dispersion; and
a penetrating agent,
wherein the first pigment dispersion contains oxidized carbon black CB-1 which is dispersed therein with a pH of the first pigment dispersion adjusted to 6 to 8 with an alkali metal hydroxide, where the oxidized carbon black CB-1 is oxidized with ozone and has a volatile content of 10% to 20% and a BET specific surface area of 90 m$^2$/g to 150 m$^2$/g, and
wherein the second pigment dispersion contains carbon black CB-2 which is dispersed therein with a naphthalene sulfonic acid-formalin condensate, where the carbon black CB-2 has an average particle diameter (D50) of 50 nm to 180 nm as measured by a dynamic light scattering method and a standard deviation of particle diameters of the carbon black CB-2 is equal to or lower than ½ of the average particle diameter (D50).

<2> The inkjet recording ink according to <1>, wherein the first pigment dispersion or the second pigment dispersion or both thereof contains a polyether-type urethane having an acid value of 40 mgKOH/g to 100 mgKOH/g.

<3> The inkjet recording ink according to any one of <1> and <2>, wherein the naphthalene sulfonic acid-formalin condensate in the second pigment dispersion contains a dimer, a trimer and a tetramer of naphthalene sulfonic acid in a total amount of 20% by mass to 80% by mass.

<4> The inkjet recording ink according to any one of <1> to <3>, wherein the alkali metal hydroxide in the first pigment dispersion is sodium hydroxide, potassium hydroxide or lithium hydroxide.

<5> The inkjet recording ink according to any one of <1> to <4>, wherein a mixing ratio by mass between the oxidized carbon black CB-1 and the carbon black CB-2, which is expressed by CB-1:CB-2, is 2:98 to 50:50.

<6> An inkjet recording ink including:
oxidized carbon black oxidized with ozone;
a compound expressed by $CH_3OCH_2CH_2CON(CH_3)_2$; and
water,
wherein the oxidized carbon black has a volatile content of 10% to 20% and a BET specific surface area of 90 m$^2$/g to 150 m$^2$/g.

<7> The inkjet recording ink according to <6>, wherein the oxidized carbon black is neutralized with an alkali metal hydroxide.

<8> The inkjet recording ink according to <7>, wherein the alkali metal hydroxide is sodium hydroxide, potassium hydroxide or lithium hydroxide.

<9> The inkjet recording ink according to any one of <6> to <8>, wherein an amount of the compound expressed by $CH_3OCH_2CH_2CON(CH_3)_2$ in the inkjet recording ink is 1% by mass to 50% by mass.

<10> The inkjet recording ink according to any one of <6> to <9>, further including a wetting agent which is glycerin or 1,3-butanediol or both thereof.

<11> A method for producing an inkjet recording ink, the method including:
oxidizing carbon black with ozone to produce oxidized carbon black; and
dispersing, in water, the oxidized carbon black and a compound expressed by $CH_3OCH_2CH_2CON(CH_3)_2$,
wherein the oxidized carbon black has a volatile content of 10% to 20% and a BET specific surface area of 90 m$^2$/g to 150 m$^2$/g.

<12> An ink cartridge including:
the inkjet recording ink according to any one of <1> to <10>; and
a container which houses the inkjet recording ink.

<13> An inkjet recording method including:
applying stimulus to the inkjet recording ink according to any one of <1> to <10> to make the inkjet recording ink jet, to thereby record an image.

<14> An inkjet recording apparatus including:
an inkjetting unit configured to apply stimulus to the inkjet recording ink according to any one of <1> to <10> to make the inkjet recording ink jet, to thereby record an image.

<15> An ink recorded matter including:
a recording medium; and
an image on the recording medium,
wherein the image is recorded thereon with the inkjet recording ink according to any one of <1> to <10>.

This application claims priorities to Japanese application No. 2011-268789, filed on Dec. 8, 2011, and to Japanese application No. 2012-020341, filed on Feb. 1, 2012, and incorporated herein by reference.

What is claimed is:

1. An inkjet recording ink comprising:
water;
a first pigment dispersion;
a second pigment dispersion; and
a penetrating agent,
wherein the first pigment dispersion comprises oxidized carbon black CB-1 which is dispersed therein with a pH of the first pigment dispersion adjusted to 6 to 8 with an alkali metal hydroxide, where the oxidized carbon black CB-1 is oxidized with ozone and has a volatile content of 10% to 20% and a BET specific surface area of 90 m$^2$/g to 150 m$^2$/g,
wherein the second pigment dispersion comprises carbon black CB-2 which is dispersed therein with a naphthalene sulfonic acid-formalin condensate, where the carbon black CB-2 has an average particle diameter (D50) of 50 nm to 180 nm as measured by a dynamic light scattering method and a standard deviation of particle diameters of the carbon black CB-2 is equal to or lower than ½ of the average particle diameter (D50), and
wherein a mixing ratio by mass between the oxidized carbon black CB-1 and the carbon black CB-2, which is expressed by CB-1:CB-2, is 2:98 to 50:50.

2. The inkjet recording ink according to claim 1, wherein the first pigment dispersion or the second pigment dispersion or both thereof comprises a polyether-type urethane having an acid value of 40 mgKOH/g to 100 mgKOH/g.

3. The inkjet recording ink according to claim 1, wherein the naphthalene sulfonic acid-formalin condensate in the second pigment dispersion comprises a dimer, a trimer and a tetramer of naphthalene sulfonic acid in a total amount of 20% by mass to 80% by mass.

4. The inkjet recording ink according to claim 1, wherein the alkali metal hydroxide in the first pigment dispersion is sodium hydroxide, potassium hydroxide or lithium hydroxide.

5. An inkjet recording method comprising:
applying stimulus to an inkjet recording ink to make the inkjet recording ink jet, to thereby record an image,
wherein the inkjet recording ink comprises:
water;
a first pigment dispersion;
a second pigment dispersion; and
a penetrating agent, wherein the first pigment dispersion comprises oxidized carbon black CB-1 which is dispersed therein with a pH of the first pigment dispersion adjusted to 6 to 8 with an alkali metal hydroxide, where the oxidized carbon black CB-1 is oxidized with ozone and has a volatile content of 10% to 20% and a BET specific surface area of 90 m$^2$/g to 150 m$^2$/g, wherein the second pigment dispersion comprises carbon black CB-2 which is dispersed therein with a naphthalene sulfonic acid-formalin condensate, where the carbon black CB-2 has an average particle diameter (D50) of 50 nm to 180 nm as measured by a dynamic light scattering method and a standard deviation of particle diameters of the carbon black CB-2 is equal to or lower than ½ of the average particle diameter (D50), and wherein a mixing ratio by mass between the oxidized carbon black CB-1 and the carbon black CB-2, which is expressed by CB-1:CB-2, is 2:98 to 50:50.

* * * * *